(12) United States Patent
Dierickx

(10) Patent No.: US 8,402,268 B2
(45) Date of Patent: Mar. 19, 2013

(54) SYSTEM AND METHOD FOR PROVIDING SECURITY ABOARD A MOVING PLATFORM

(75) Inventor: Michael Dierickx, Temecula, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 275 days.

(21) Appl. No.: 12/813,973

(22) Filed: Jun. 11, 2010

(65) Prior Publication Data

US 2010/0318794 A1    Dec. 16, 2010

Related U.S. Application Data

(60) Provisional application No. 61/186,330, filed on Jun. 11, 2009.

(51) Int. Cl.
*H04L 29/06* (2006.01)
*H04L 9/00* (2006.01)

(52) U.S. Cl. ............................... 713/164; 726/23; 726/5

(58) Field of Classification Search .................. 713/164; 726/23, 5
See application file for complete search history.

(56) References Cited

U.S. PATENT DOCUMENTS

| | | | |
|---|---|---|---|
| 3,037,812 A | 6/1962 | Monroe | |
| 3,717,809 A | 2/1973 | Laukien | |
| 3,795,771 A | 3/1974 | Gundersen et al. | |
| 3,980,954 A | 9/1976 | Whyte | |
| 4,163,387 A | 8/1979 | Schroeder | |
| 4,208,740 A | 6/1980 | Yin et al. | |
| 4,367,488 A | 1/1983 | Leventer et al. | |
| 4,428,078 A | 1/1984 | Kuo | |
| 4,583,131 A | 4/1986 | Dakin | |
| 4,584,603 A | 4/1986 | Harrison | |
| 4,647,980 A | 3/1987 | Steventon et al. | |
| 4,742,544 A | 5/1988 | Kupnicki et al. | |
| 4,774,514 A | 9/1988 | Hildebrandt et al. | |

(Continued)

FOREIGN PATENT DOCUMENTS

| CN | 1462552 A | 12/2003 |
|---|---|---|
| CN | ZL200520103236.4 | 12/2006 |

(Continued)

OTHER PUBLICATIONS

Online Citation: Pentar Avionics: "Jetlan AS200 Advanced Airborne Computer" (Sep. 2002) XP002293451; http://www.pentar.com/PDF/DD-AS100.pdf (retrieved on Aug. 23, 2004) 2 pgs.

(Continued)

*Primary Examiner* — Kambiz Zand
*Assistant Examiner* — Aubrey Wyszynski
(74) *Attorney, Agent, or Firm* — Orrick, Herrington & Sutcliffe LLP

(57) ABSTRACT

A system for providing network security on a vehicle information system and methods for manufacturing and using same. The security system comprises an all-in-one security system that facilitates security system functions for the vehicle information system. Exemplary security system functions include secure storage of keys used to encrypt and/or decrypt system data, security-related application programming interfaces, a security log file, and/or private data. The security system likewise can utilize antivirus software, antispyware software, an application firewall, and/or a network firewall. As desired, the security system can include an intrusion prevention system and/or an intrusion detection system. If the information system includes a wireless distribution system, the security system can include an intrusion prevention (and/or detection) system that is suitable for use with wireless network systems. Thereby, the security system advantageously can provide a defense in depth approach by adding multiple layers of security to the information system.

25 Claims, 12 Drawing Sheets

U.S. PATENT DOCUMENTS

| | | |
|---|---|---|
| 4,835,604 A | 5/1989 | Kondo et al. |
| 4,866,515 A | 9/1989 | Tagawa et al. |
| 4,866,704 A | 9/1989 | Bergman |
| 4,866,732 A | 9/1989 | Carey et al. |
| 4,887,152 A | 12/1989 | Matsuzalci et al. |
| 4,890,104 A | 12/1989 | Takanabe et al. |
| 4,896,209 A | 1/1990 | Matsuzaki et al. |
| 4,897,714 A | 1/1990 | Ichise et al. |
| 4,939,527 A | 7/1990 | Lamberty et al. |
| 4,958,381 A | 9/1990 | Toyoshima |
| 4,975,696 A | 12/1990 | Salter, Jr. et al. |
| 5,001,642 A | 3/1991 | Botzenhardt et al. |
| 5,005,183 A | 4/1991 | Carey et al. |
| 5,009,384 A | 4/1991 | Gerke |
| 5,027,124 A | 6/1991 | Fitzsimmons et al. |
| 5,034,808 A | 7/1991 | Murray |
| 5,057,835 A | 10/1991 | Factor et al. |
| 5,119,104 A | 6/1992 | Heller |
| 5,123,015 A | 6/1992 | Brady, Jr. et al. |
| 5,136,304 A | 8/1992 | Peters |
| 5,142,550 A | 8/1992 | Tymes |
| 5,144,290 A | 9/1992 | Honda et al. |
| 5,144,291 A | 9/1992 | Nishizawa |
| 5,151,896 A | 9/1992 | Bowman et al. |
| 5,168,272 A | 12/1992 | Akashi et al. |
| 5,177,616 A | 1/1993 | Riday |
| 5,189,671 A | 2/1993 | Cheng |
| 5,195,183 A | 3/1993 | Miller et al. |
| 5,208,590 A | 5/1993 | Pitts |
| 5,237,659 A | 8/1993 | Takats |
| 5,243,652 A | 9/1993 | Teare et al. |
| 5,247,414 A | 9/1993 | Mitchell et al. |
| 5,276,455 A | 1/1994 | Fitzsimmons et al. |
| 5,280,498 A | 1/1994 | Tymes et al. |
| 5,283,868 A | 2/1994 | Baker et al. |
| 5,289,272 A | 2/1994 | Rabowsky et al. |
| 5,289,378 A | 2/1994 | Miller et al. |
| 5,295,089 A | 3/1994 | Ambasz |
| 5,301,185 A | 4/1994 | Cherry |
| 5,305,308 A | 4/1994 | English et al. |
| 5,305,321 A | 4/1994 | Crayford |
| 5,311,302 A | 5/1994 | Berry et al. |
| 5,311,515 A | 5/1994 | Henderson et al. |
| 5,325,131 A | 6/1994 | Penney |
| 5,343,456 A | 8/1994 | Maeda |
| 5,383,178 A | 1/1995 | Unverrich |
| 5,390,326 A | 2/1995 | Shah et al. |
| 5,410,754 A | 4/1995 | Klotzbach et al. |
| 5,424,951 A | 6/1995 | Nobe et al. |
| 5,444,762 A | 8/1995 | Frey et al. |
| 5,463,656 A | 10/1995 | Polivka et al. |
| 5,469,363 A | 11/1995 | Saliga |
| 5,481,478 A | 1/1996 | Palmieri et al. |
| 5,493,702 A | 2/1996 | Crowley et al. |
| 5,524,272 A | 6/1996 | Podowski et al. |
| 5,543,805 A | 8/1996 | Thaniyavarn |
| 5,555,466 A | 9/1996 | Scribner et al. |
| 5,557,656 A | 9/1996 | Ray et al. |
| 5,568,484 A | 10/1996 | Margis |
| 5,579,315 A | 11/1996 | Lyu et al. |
| 5,596,647 A | 1/1997 | Wakai et al. |
| 5,610,822 A | 3/1997 | Murphy |
| 5,617,331 A | 4/1997 | Wakai et al. |
| 5,631,629 A | 5/1997 | Fooks et al. |
| 5,640,002 A | 6/1997 | Ruppert et al. |
| 5,666,291 A | 9/1997 | Scott et al. |
| 5,678,171 A | 10/1997 | Toyoma et al. |
| 5,701,582 A | 12/1997 | DeBey |
| 5,706,353 A | 1/1998 | Arai et al. |
| 5,709,448 A | 1/1998 | Jennings et al. |
| 5,711,014 A | 1/1998 | Crowley et al. |
| 5,745,159 A | 4/1998 | Wax et al. |
| 5,751,248 A | 5/1998 | Thaniyavarn |
| 5,760,819 A | 6/1998 | Sklar et al. |
| 5,790,175 A | 8/1998 | Sklar et al. |
| 5,790,423 A | 8/1998 | Lau et al. |
| 5,790,787 A | 8/1998 | Scott et al. |
| 5,801,751 A | 9/1998 | Sklar et al. |
| 5,808,660 A | 9/1998 | Sekine et al. |
| 5,812,751 A | 9/1998 | Ekrot et al. |
| 5,831,664 A | 11/1998 | Wharton et al. |
| 5,832,380 A | 11/1998 | Ray et al. |
| 5,835,127 A | 11/1998 | Booth et al. |
| 5,854,591 A | 12/1998 | Atkinson |
| 5,857,869 A | 1/1999 | Parcel et al. |
| 5,878,345 A | 3/1999 | Ray et al. |
| 5,878,346 A | 3/1999 | Ray et al. |
| 5,884,166 A | 3/1999 | Ray et al. |
| 5,889,268 A | 3/1999 | Swartz |
| 5,889,775 A | 3/1999 | Sawicz et al. |
| 5,929,895 A | 7/1999 | Berry et al. |
| 5,944,803 A | 8/1999 | Whitehouse |
| 5,950,129 A | 9/1999 | Schmid et al. |
| 5,953,429 A | 9/1999 | Wakai et al. |
| 5,959,596 A | 9/1999 | McCarten et al. |
| 5,960,343 A | 9/1999 | Ray et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,014,381 A | 1/2000 | Troxel et al. |
| 6,020,848 A | 2/2000 | Wallace et al. |
| 6,047,165 A | 4/2000 | Wright et al. |
| 6,058,288 A | 5/2000 | Reed et al. |
| 6,078,297 A | 6/2000 | Kormanyos |
| 6,078,348 A | 6/2000 | Klosterman et al. |
| 6,108,523 A | 8/2000 | Wright et al. |
| 6,108,539 A | 8/2000 | Ray et al. |
| 6,129,274 A | 10/2000 | Suzuki |
| 6,130,727 A | 10/2000 | Toyozumi |
| 6,135,549 A | 10/2000 | Demick et al. |
| 6,137,377 A | 10/2000 | Wallace et al. |
| 6,151,497 A | 11/2000 | Yee et al. |
| 6,154,186 A | 11/2000 | Smith et al. |
| 6,160,998 A | 12/2000 | Wright et al. |
| 6,163,681 A | 12/2000 | Wright et al. |
| 6,167,238 A | 12/2000 | Wright |
| 6,173,159 B1 | 1/2001 | Wright et al. |
| 6,177,887 B1 | 1/2001 | Jerome |
| 6,181,990 B1 | 1/2001 | Grabowsky et al. |
| 6,201,797 B1 | 3/2001 | Leuca et al. |
| 6,208,307 B1 | 3/2001 | Frisco et al. |
| 6,216,065 B1 | 4/2001 | Hall et al. |
| 6,249,913 B1 | 6/2001 | Galipeau et al. |
| 6,266,664 B1 | 7/2001 | Russell-Falla et al. |
| 6,271,728 B1 | 8/2001 | Wallace et al. |
| 6,278,936 B1 | 8/2001 | Jones |
| 6,285,878 B1 | 9/2001 | Lai |
| 6,286,139 B1 | 9/2001 | Decinque |
| 6,308,045 B1 | 10/2001 | Wright et al. |
| 6,321,084 B1 | 11/2001 | Horrer |
| 6,338,045 B1 | 1/2002 | Pappas |
| 6,345,720 B1 | 2/2002 | Redden et al. |
| 6,351,247 B1 | 2/2002 | Linstrom et al. |
| 6,356,239 B1 | 3/2002 | Carson |
| 6,370,656 B1 | 4/2002 | Olarig et al. |
| 6,377,802 B1 | 4/2002 | McKenna et al. |
| 6,390,920 B1 | 5/2002 | Infiesto et al. |
| 6,392,692 B1 | 5/2002 | Monroe |
| 6,400,315 B1 | 6/2002 | Adler et al. |
| 6,408,180 B1 | 6/2002 | McKenna et al. |
| 6,414,644 B1 | 7/2002 | Desargant et al. |
| 6,417,803 B1 | 7/2002 | de La Chapelle et al. |
| 6,424,313 B1 | 7/2002 | Navarro et al. |
| 6,483,458 B1 | 11/2002 | Carson |
| 6,484,011 B1 | 11/2002 | Thompson et al. |
| 6,487,540 B1 | 11/2002 | Smith et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,522,867 B1 | 2/2003 | Wright et al. |
| 6,529,706 B1 | 3/2003 | Mitchell |
| 6,538,656 B1 | 3/2003 | Cheung et al. |
| 6,542,086 B2 | 4/2003 | Baumgartner et al. |
| 6,549,754 B1 | 4/2003 | Miller et al. |
| 6,559,812 B1 | 5/2003 | McCarten et al. |

| Patent Number | Date | Inventor |
|---|---|---|
| 6,570,881 B1 | 5/2003 | Wils et al. |
| 6,574,338 B1 | 6/2003 | Sachdev |
| 6,580,402 B2 | 6/2003 | Navarro et al. |
| 6,594,471 B1 | 7/2003 | Crowley et al. |
| 6,598,227 B1 | 7/2003 | Berry et al. |
| 6,600,418 B2 | 7/2003 | Francis et al. |
| 6,606,056 B2 | 8/2003 | Brogden |
| 6,609,103 B1 | 8/2003 | Kolls |
| 6,611,537 B1 | 8/2003 | Edens et al. |
| 6,618,580 B2 | 9/2003 | Parrott et al. |
| 6,622,124 B1 | 9/2003 | Kolls |
| 6,628,235 B2 | 9/2003 | Wight |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,661,353 B1 | 12/2003 | Gopen |
| 6,674,339 B2 | 1/2004 | Kormanyos |
| 6,674,398 B2 | 1/2004 | Murphy |
| 6,684,240 B1 | 1/2004 | Goddard |
| 6,693,236 B1 | 2/2004 | Gould et al. |
| 6,702,604 B1 | 3/2004 | Moscovitch |
| 6,703,974 B2 | 3/2004 | White et al. |
| 6,707,346 B2 | 3/2004 | Tillotson et al. |
| 6,708,019 B2 | 3/2004 | McLain et al. |
| 6,714,163 B2 | 3/2004 | Navarro et al. |
| 6,725,035 B2 | 4/2004 | Jochim et al. |
| 6,728,535 B2 | 4/2004 | Parkman |
| 6,731,909 B2 | 5/2004 | McLain et al. |
| 6,736,315 B2 | 5/2004 | Swartz |
| 6,741,141 B2 | 5/2004 | Kormanyos |
| 6,741,841 B1 | 5/2004 | Mitchell |
| 6,745,010 B2 | 6/2004 | Wright et al. |
| 6,747,960 B2 | 6/2004 | Tillotson |
| 6,748,597 B1 | 6/2004 | Frisco et al. |
| 6,757,712 B1 | 6/2004 | Bastian et al. |
| 6,771,608 B2 | 8/2004 | Tillotson |
| 6,775,545 B2 | 8/2004 | Wright et al. |
| 6,778,825 B2 | 8/2004 | Parkman |
| 6,782,392 B1 | 8/2004 | Weinberger et al. |
| 6,785,526 B2 | 8/2004 | McLain et al. |
| 6,788,935 B1 | 9/2004 | McKenna et al. |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,813,777 B1 | 11/2004 | Weinberger et al. |
| 6,820,221 B2 | 11/2004 | Fleming |
| 6,844,855 B2 | 1/2005 | Carson |
| 6,847,801 B2 | 1/2005 | de La Chapelle et al. |
| 6,876,905 B2 | 4/2005 | Farley et al. |
| 6,885,845 B1 | 4/2005 | Crowley et al. |
| 6,885,863 B2 | 4/2005 | Parkman et al. |
| 6,885,864 B2 | 4/2005 | McKenna et al. |
| 6,889,042 B2 | 5/2005 | Rousseau et al. |
| 6,892,052 B2 | 5/2005 | Kotola et al. |
| 6,899,390 B2 | 5/2005 | Sanfrod et al. |
| 6,920,611 B1 | 7/2005 | Spaeth et al. |
| 6,937,164 B2 | 8/2005 | Thomson et al. |
| 6,938,190 B2 | 8/2005 | Okuda |
| 6,938,258 B1 | 8/2005 | Weinberger et al. |
| 6,940,978 B2 | 9/2005 | Parkman |
| 6,941,111 B2 | 9/2005 | McLain et al. |
| 6,946,990 B2 | 9/2005 | Monk |
| 6,947,726 B2 | 9/2005 | Rockwell |
| 6,947,733 B2 | 9/2005 | Tillotson |
| 6,959,168 B2 | 10/2005 | Parkman |
| 6,963,304 B2 | 11/2005 | Murphy |
| 6,965,851 B2 | 11/2005 | Tillotson |
| 6,971,608 B2 | 12/2005 | Harrington et al. |
| 6,973,479 B2 | 12/2005 | Brady, Jr. et al. |
| 6,974,076 B1 | 12/2005 | Siegel |
| 6,975,587 B1 | 12/2005 | Adamski et al. |
| 6,975,616 B2 | 12/2005 | Stephenson et al. |
| 6,983,312 B1 | 1/2006 | O'Neil |
| 6,985,588 B1 | 1/2006 | Glick et al. |
| 6,985,942 B2 | 1/2006 | D'Annunzio et al. |
| 6,990,338 B2 | 1/2006 | Miller et al. |
| 6,993,288 B2 | 1/2006 | de La Chapelle et al. |
| 7,003,293 B2 | 2/2006 | D'Annunzio |
| 7,023,996 B2 | 4/2006 | Stephenson et al. |
| 7,036,889 B2 | 5/2006 | Sanfrod et al. |
| 7,039,827 B2 | 5/2006 | Meyer et al. |
| 7,054,593 B2 | 5/2006 | de La Chapelle et al. |
| 7,062,268 B2 | 6/2006 | McKenna |
| 7,068,615 B2 | 6/2006 | Niesen |
| 7,072,634 B2 | 7/2006 | Tillotson |
| 7,085,563 B2 | 8/2006 | Parkman |
| 7,086,081 B2 | 8/2006 | Martinez et al. |
| 7,099,665 B2 | 8/2006 | Taylor |
| 7,100,187 B2 | 8/2006 | Pierzga et al. |
| 7,107,062 B2 | 9/2006 | Cruz et al. |
| 7,113,780 B2 | 9/2006 | McKenna et al. |
| 7,120,389 B2 | 10/2006 | de La Chapelle et al. |
| 7,123,199 B2 | 10/2006 | Rotta |
| 7,124,426 B1 | 10/2006 | Tsuria et al. |
| 7,136,621 B2 | 11/2006 | de La Chapelle et al. |
| 7,139,258 B2 | 11/2006 | Tillotson |
| 7,155,168 B2 | 12/2006 | McLain et al. |
| 7,161,788 B2 | 1/2007 | Richie et al. |
| 7,162,235 B1 | 1/2007 | Gilbert |
| 7,171,197 B2 | 1/2007 | Miller et al. |
| 7,177,638 B2 | 2/2007 | Funderburk et al. |
| 7,187,690 B2 | 3/2007 | Taylor |
| 7,187,927 B1 | 3/2007 | Mitchell |
| 7,233,958 B2 | 6/2007 | Weng et al. |
| 7,250,915 B2 | 7/2007 | Nelson |
| 7,269,761 B2 | 9/2007 | Yi |
| 7,274,336 B2 | 9/2007 | Carson |
| 7,280,825 B2 | 10/2007 | Keen et al. |
| 7,286,503 B1 | 10/2007 | Clarke et al. |
| 7,299,013 B2 | 11/2007 | Rotta et al. |
| 7,302,226 B2 | 11/2007 | Stephenson |
| 7,321,383 B2 | 1/2008 | Monagahn et al. |
| 7,328,012 B2 | 2/2008 | Ziarno et al. |
| 7,330,151 B1 | 2/2008 | Monk et al. |
| 7,343,157 B1 | 3/2008 | Mitchell |
| 7,359,700 B2 | 4/2008 | Swensen et al. |
| 7,362,262 B2 | 4/2008 | Murphy |
| 7,382,327 B2 | 6/2008 | Nelson |
| 7,400,858 B2 | 7/2008 | Crowley et al. |
| 7,406,309 B2 | 7/2008 | Usher et al. |
| 7,414,573 B2 | 8/2008 | Murphy |
| 7,437,125 B2 | 10/2008 | McLain et al. |
| 7,450,901 B2 | 11/2008 | Parkman |
| 7,454,202 B2 | 11/2008 | de La Chappelle |
| 7,454,203 B2 | 11/2008 | Levitan |
| 7,460,866 B2 | 12/2008 | Salkini et al. |
| 7,483,696 B1 | 1/2009 | Mitchell |
| 7,486,927 B2 | 2/2009 | Kallio et al. |
| 7,496,361 B1 | 2/2009 | Mitchell et al. |
| 7,508,342 B2 | 3/2009 | Nelson |
| 7,690,012 B2 | 3/2010 | Luehrs |
| 7,904,244 B2 | 3/2011 | Sugla |
| 2001/0025377 A1 | 9/2001 | Hinderks |
| 2002/0013150 A1 | 1/2002 | McKenna et al. |
| 2002/0045444 A1 | 4/2002 | User et al. |
| 2002/0045484 A1 | 4/2002 | Eck et al. |
| 2002/0046406 A1 | 4/2002 | Chelehmal et al. |
| 2002/0058478 A1 | 5/2002 | de La Chapelle et al. |
| 2002/0059363 A1 | 5/2002 | Katz et al. |
| 2002/0059614 A1 | 5/2002 | Lipsanen et al. |
| 2002/0065698 A1 | 5/2002 | Schick |
| 2002/0065711 A1 | 5/2002 | Fujisawa et al. |
| 2002/0069293 A1 | 6/2002 | Natalio |
| 2002/0087992 A1 | 7/2002 | Bengeult et al. |
| 2002/0094829 A1 | 7/2002 | Ritter |
| 2002/0095680 A1 | 7/2002 | Davidson |
| 2002/0136540 A1 | 9/2002 | Adams et al. |
| 2002/0152432 A1 | 10/2002 | Fleming |
| 2002/0152446 A1 | 10/2002 | Fleming |
| 2002/0152470 A1 | 10/2002 | Hammond |
| 2002/0162113 A1 | 10/2002 | Hunter |
| 2002/0164960 A1 | 11/2002 | Slaughter et al. |
| 2002/0169706 A1* | 11/2002 | Chandra et al. ............... 705/37 |
| 2002/0170060 A1 | 11/2002 | Lyman |
| 2002/0178451 A1 | 11/2002 | Ficco |
| 2002/0184555 A1 | 12/2002 | Wong et al. |

| | | |
|---|---|---|
| 2002/0197990 A1 | 12/2002 | Jochim et al. |
| 2003/0003899 A1 | 1/2003 | Tashiro et al. |
| 2003/0008652 A1 | 1/2003 | Jochim et al. |
| 2003/0020991 A1 | 1/2003 | Chang |
| 2003/0043760 A1 | 3/2003 | Taylor |
| 2003/0047647 A1 | 3/2003 | Poblete |
| 2003/0055975 A1 | 3/2003 | Nelson et al. |
| 2003/0060190 A1 | 3/2003 | Mallart |
| 2003/0067542 A1 | 4/2003 | Monroe |
| 2003/0069015 A1 | 4/2003 | Brinkley et al. |
| 2003/0069990 A1 | 4/2003 | D'Annunzio et al. |
| 2003/0077308 A1 | 4/2003 | Rosen |
| 2003/0084130 A1 | 5/2003 | D'Annunzio |
| 2003/0084451 A1 | 5/2003 | Pierzga et al. |
| 2003/0085818 A1 | 5/2003 | Renton et al. |
| 2003/0087672 A1 | 5/2003 | Kattukaran et al. |
| 2003/0093798 A1 | 5/2003 | Rogerson |
| 2003/0107248 A1 | 6/2003 | Sanford et al. |
| 2003/0126614 A1 | 7/2003 | Staiger |
| 2003/0130769 A1 | 7/2003 | Farley et al. |
| 2003/0140345 A1 | 7/2003 | Fisk et al. |
| 2003/0148736 A1 | 8/2003 | Wright et al. |
| 2003/0158958 A1 | 8/2003 | Chiu |
| 2003/0160710 A1 | 8/2003 | Baumgartner et al. |
| 2003/0161411 A1 | 8/2003 | McCorkle et al. |
| 2003/0169563 A1 | 9/2003 | Adams |
| 2003/0184449 A1 | 10/2003 | Baumgartner et al. |
| 2003/0200482 A1 | 10/2003 | Sullivan |
| 2003/0217363 A1 | 11/2003 | Brady, Jr. et al. |
| 2003/0233469 A1 | 12/2003 | Knowlson et al. |
| 2003/0233658 A1 | 12/2003 | Keen et al. |
| 2003/0237016 A1 | 12/2003 | Johnson et al. |
| 2004/0001303 A1 | 1/2004 | Doblar et al. |
| 2004/0034816 A1 | 2/2004 | Richard |
| 2004/0054923 A1 | 3/2004 | Seago et al. |
| 2004/0077308 A1 | 4/2004 | Sanford et al. |
| 2004/0078821 A1 | 4/2004 | Frisco et al. |
| 2004/0088412 A1 | 5/2004 | John et al. |
| 2004/0098745 A1 | 5/2004 | Marston et al. |
| 2004/0108963 A1 | 6/2004 | Clymer et al. |
| 2004/0111523 A1 | 6/2004 | Hall et al. |
| 2004/0123322 A1 | 6/2004 | Erkocevic et al. |
| 2004/0128688 A1 | 7/2004 | Seo |
| 2004/0133634 A1 | 7/2004 | Luke et al. |
| 2004/0139467 A1 | 7/2004 | Rogerson et al. |
| 2004/0142658 A1 | 7/2004 | McKenna et al. |
| 2004/0147243 A1 | 7/2004 | McKenna |
| 2004/0158863 A1 | 8/2004 | McLain |
| 2004/0162928 A1 | 8/2004 | Benson |
| 2004/0167967 A1 | 8/2004 | Bastian et al. |
| 2004/0183346 A1 | 9/2004 | Sanford et al. |
| 2004/0192339 A1 | 9/2004 | Wilson et al. |
| 2004/0198346 A1 | 10/2004 | Swensen et al. |
| 2004/0235469 A1 | 11/2004 | Krug |
| 2004/0252965 A1 | 12/2004 | Moreno et al. |
| 2004/0252966 A1 | 12/2004 | Holloway et al. |
| 2004/0253951 A1 | 12/2004 | Chang et al. |
| 2005/0021602 A1 | 1/2005 | Noel et al. |
| 2005/0026608 A1 | 2/2005 | Kallio et al. |
| 2005/0027787 A1 | 2/2005 | Kuhn et al. |
| 2005/0039208 A1 | 2/2005 | Veeck et al. |
| 2005/0044564 A1 | 2/2005 | Stopniewicz et al. |
| 2005/0067530 A1 | 3/2005 | Schafer, Jr. et al. |
| 2005/0102322 A1 | 5/2005 | Bagley et al. |
| 2005/0114894 A1 | 5/2005 | Hoerl |
| 2005/0132407 A1 | 6/2005 | Boyer et al. |
| 2005/0136917 A1 | 6/2005 | Taylor |
| 2005/0138654 A1 | 6/2005 | Minne |
| 2005/0149684 A1 | 7/2005 | Sankaran et al. |
| 2005/0171653 A1 | 8/2005 | Taylor |
| 2005/0176368 A1 | 8/2005 | Young et al. |
| 2005/0177763 A1 | 8/2005 | Stoler |
| 2005/0181723 A1 | 8/2005 | Miller et al. |
| 2005/0187677 A1* | 8/2005 | Walker .......................... 701/16 |
| 2005/0193257 A1 | 9/2005 | Stoler |
| 2005/0202785 A1 | 9/2005 | Meyer |
| 2005/0215249 A1 | 9/2005 | Little et al. |
| 2005/0216938 A1 | 9/2005 | Brady et al. |
| 2005/0239261 A1 | 10/2005 | Tai et al. |
| 2005/0251798 A1 | 11/2005 | Fraley |
| 2005/0256616 A1 | 11/2005 | Rhoads |
| 2005/0268319 A1 | 12/2005 | Brady, Jr. |
| 2005/0268320 A1 | 12/2005 | Smith |
| 2005/0270373 A1 | 12/2005 | Trela |
| 2005/0273823 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2005/0281223 A1 | 12/2005 | D'Annunzio |
| 2006/0006287 A1 | 1/2006 | Ferguson et al. |
| 2006/0008256 A1 | 1/2006 | Khedouri et al. |
| 2006/0010438 A1 | 1/2006 | Brady, Jr. et al. |
| 2006/0030311 A1 | 2/2006 | Cruz et al. |
| 2006/0032979 A1 | 2/2006 | Mitchell et al. |
| 2006/0040612 A1 | 2/2006 | Min |
| 2006/0040660 A1 | 2/2006 | Cruz et al. |
| 2006/0048196 A1 | 3/2006 | Yau |
| 2006/0088001 A1 | 4/2006 | Reitmann et al. |
| 2006/0107295 A1 | 5/2006 | Margis et al. |
| 2006/0128303 A1 | 6/2006 | Schedivy |
| 2006/0143662 A1 | 6/2006 | Easterling et al. |
| 2006/0154601 A1 | 7/2006 | Tewalt et al. |
| 2006/0174285 A1 | 8/2006 | Brady, Jr. et al. |
| 2006/0183450 A1 | 8/2006 | Cameron |
| 2006/0187959 A1 | 8/2006 | Kawaguchi et al. |
| 2006/0197750 A1 | 9/2006 | Kerr |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0250947 A1 | 11/2006 | Allen |
| 2006/0264173 A1 | 11/2006 | Gilbert |
| 2006/0270373 A1 | 11/2006 | So |
| 2006/0270470 A1 | 11/2006 | de La Chapelle et al. |
| 2006/0276127 A1 | 12/2006 | Cruz et al. |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0021117 A1 | 1/2007 | McKenna et al. |
| 2007/0022018 A1 | 1/2007 | Suryanarayana et al. |
| 2007/0025240 A1 | 2/2007 | Snide |
| 2007/0026795 A1 | 2/2007 | de La Chapelle |
| 2007/0042772 A1 | 2/2007 | Salkini et al. |
| 2007/0044126 A1 | 2/2007 | Mitchell |
| 2007/0060133 A1 | 3/2007 | Spitzer et al. |
| 2007/0077998 A1* | 4/2007 | Petrisor .......................... 463/42 |
| 2007/0112487 A1 | 5/2007 | Avery |
| 2007/0115938 A1* | 5/2007 | Conzachi et al. ............. 370/352 |
| 2007/0130599 A1 | 6/2007 | Monroe |
| 2007/0155381 A1 | 7/2007 | Alberth et al. |
| 2007/0155421 A1 | 7/2007 | Alberth et al. |
| 2007/0185977 A1 | 8/2007 | Sato et al. |
| 2007/0202802 A1 | 8/2007 | Kallio et al. |
| 2007/0213009 A1 | 9/2007 | Higashida et al. |
| 2007/0258417 A1 | 11/2007 | Harvey et al. |
| 2007/0298741 A1 | 12/2007 | Harnist et al. |
| 2008/0004016 A1 | 1/2008 | Smee et al. |
| 2008/0023600 A1 | 1/2008 | Perlman |
| 2008/0040756 A1 | 2/2008 | Perlman |
| 2008/0084882 A1 | 4/2008 | Eruchimovitch |
| 2008/0085691 A1 | 4/2008 | Harvey et al. |
| 2008/0090567 A1 | 4/2008 | Gilbert |
| 2008/0124054 A1 | 5/2008 | Bonar |
| 2008/0125112 A1 | 5/2008 | Clarke et al. |
| 2008/0127278 A1 | 5/2008 | Bonar |
| 2008/0130539 A1 | 6/2008 | Lauer et al. |
| 2008/0132212 A1 | 6/2008 | Lemond et al. |
| 2008/0133705 A1 | 6/2008 | Lemond et al. |
| 2008/0141314 A1 | 6/2008 | Lemond et al. |
| 2008/0181169 A1 | 7/2008 | Lauer et al. |
| 2008/0182573 A1 | 7/2008 | Lauer et al. |
| 2008/0255722 A1 | 10/2008 | McClellan |
| 2008/0274734 A1 | 11/2008 | Kostanic et al. |
| 2008/0299965 A1 | 12/2008 | Lagerman |
| 2008/0305762 A1 | 12/2008 | Malosh |
| 2009/0007193 A1 | 1/2009 | Correa et al. |
| 2009/0010200 A1 | 1/2009 | Lauer et al. |
| 2009/0042651 A1 | 2/2009 | Prabhu et al. |
| 2009/0077595 A1 | 3/2009 | Sizelove et al. |
| 2009/0083805 A1 | 3/2009 | Sizelove et al. |

| | | | |
|---|---|---|---|
| 2009/0094635 A1 | 4/2009 | Aslin et al. | |
| 2010/0306773 A1* | 12/2010 | Lee et al. | 718/1 |
| 2010/0318794 A1* | 12/2010 | Dierickx | 713/164 |

FOREIGN PATENT DOCUMENTS

| | | |
|---|---|---|
| EP | 0 277 014 B1 | 8/1988 |
| EP | 0 767 594 A2 | 9/1997 |
| EP | 0 890 907 A1 | 1/1999 |
| EP | 0 930 513 A2 | 7/1999 |
| EP | 1 078 852 A2 | 2/2001 |
| EP | 1 134 658 A3 | 6/2002 |
| EP | 1 217 833 A2 | 6/2002 |
| EP | 1 217 833 A3 | 4/2004 |
| EP | 1 458 590 B | 6/2005 |
| GB | 2 235 800 A | 3/1991 |
| JP | 58-46485 | 3/1983 |
| JP | 62-238693 | 10/1987 |
| JP | 2002-77084 A | 3/2002 |
| JP | 2004-343744 A | 12/2004 |
| JP | 2005-508098 A | 3/2005 |
| JP | 2006-527540 A | 11/2006 |
| WO | WO 99/31821 A1 | 6/1999 |
| WO | WO 02/15582 A1 | 2/2002 |
| WO | WO 02/084971 A2 | 10/2002 |
| WO | WO 03/024110 A1 | 3/2003 |
| WO | WO 03/032503 A2 | 4/2003 |
| WO | WO 03/050000 A1 | 6/2003 |
| WO | WO 03/024085 A2 | 8/2003 |
| WO | WO 2004/003696 A2 | 1/2004 |
| WO | WO 2004/008277 A2 | 1/2004 |
| WO | WO 2005/086865 A2 | 9/2005 |
| WO | WO 2005/125207 A2 | 12/2005 |
| WO | WO 2006/052941 A1 | 5/2006 |
| WO | WO 2006/062641 A2 | 6/2006 |
| WO | WO 2006/065381 A2 | 6/2006 |
| WO | WO 2007/035739 A2 | 3/2007 |
| WO | WO 2007/050164 A1 | 5/2007 |

OTHER PUBLICATIONS

EP, Office Action, EP Application No. 08 830 787.1, Dec. 9, 2011.
Y.F. Chen, et al., "Personalized Multimedia Services Using a Mobile Service Platform", IEEE 2002, pp. 918-925.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.
Kartalopoulos S V: "Consumer Communications in the Next Generation Access Network" Consumer Communications and Networking Conference, 2004. CCNC 2004. First IEEE Las Vegas, NV, USA Jan. 5-8, 2004, Piscataway, NJ (Jan. 5, 2004), pp. 273-278.
Farries, M. et al: "Optical Branching Devices for Avionic Passive Optical Network" Avionics, Fiber-Optics and Photonics Technology Conference, 2007 IEEE, IEEE, PI, Oct. 1, 2007, pp. 76-77.
CN, Office Action, Appl. No. 200880107132.7, Jul. 22, 2011.
JP, Office Action, Japanese Application No. 2009-523977, Jul. 17, 2012.
CN, 200880117151.8 Office Action with English Translation, Aug. 24, 2012.
JP, 2010-527121 Office Action with English Translation, Jul. 12, 2012.

* cited by examiner

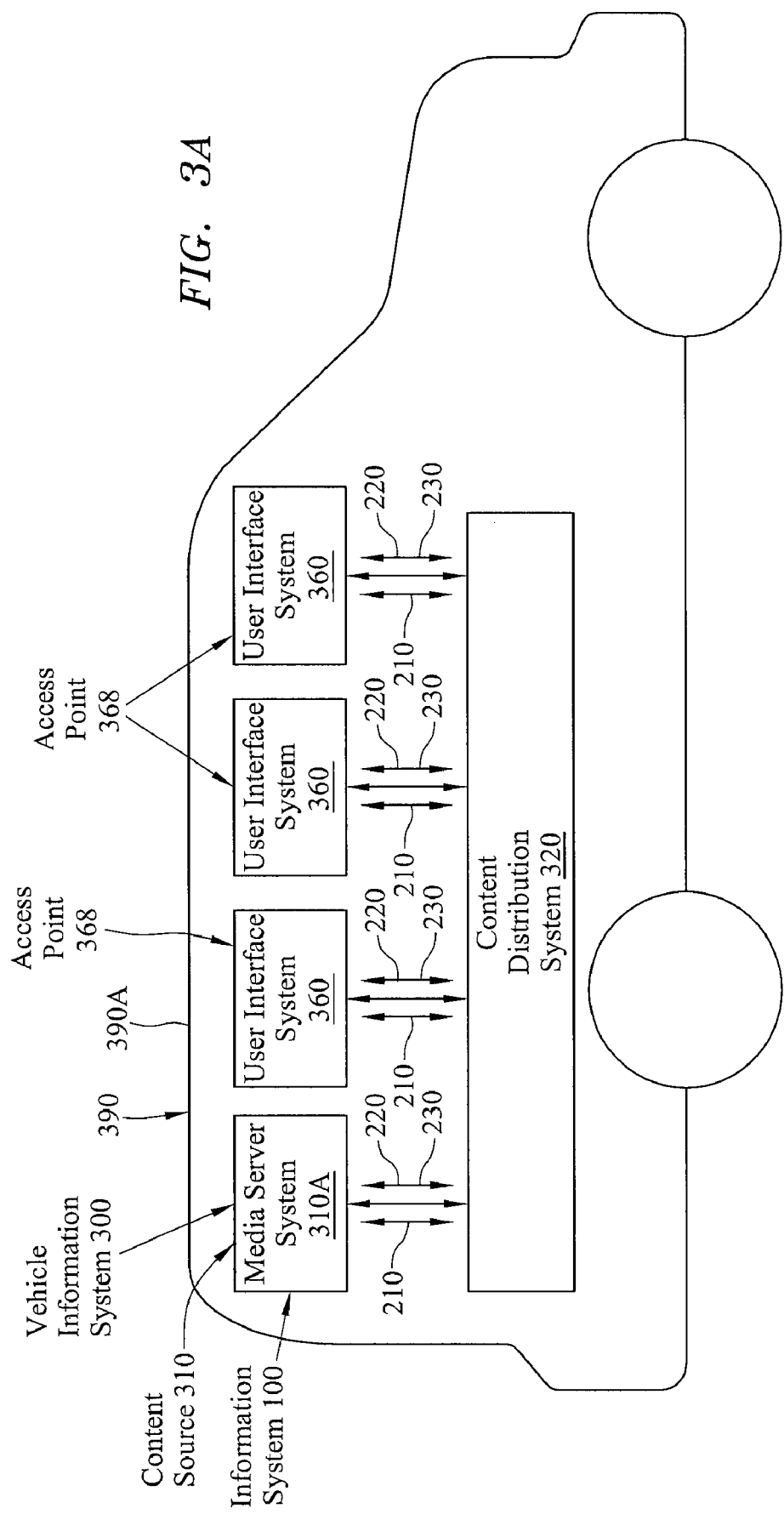

SYSTEM AND METHOD FOR PROVIDING SECURITY ABOARD A MOVING PLATFORM

CROSS-REFERENCE TO RELATED APPLICATIONS

This application claims priority to U.S. provisional patent application, Ser. No. 61/186,330, filed Jun. 11, 2009. Priority to the provisional patent application is expressly claimed, and the disclosure of the provisional application is hereby incorporated herein by reference in its entirety and for all purposes.

FIELD

The present application relates generally to network security systems and more particularly, but not exclusively, to security systems suitable for use with vehicle information systems installed aboard passenger vehicles.

BACKGROUND

Vehicles, such as automobiles and aircraft, often include vehicle information systems for satisfying passenger demand for access to viewing content, such as entertainment, information content, or other viewing content, while traveling. Conventional vehicle information (or entertainment) systems typically include overhead cabin video systems or seat-based video systems with individual controls such that viewing content is selectable by the passengers. Handheld (or portable) media devices also can be made available for selecting and presenting the viewing content. The viewing content can include audio and video content that is derived from a variety of content sources. Prerecorded viewing content, such as motion pictures and music, can be provided by internal content sources, such as audio and video players, that are installed aboard the vehicle. The conventional vehicle information systems likewise can include antenna systems for receiving viewing content, such as live television programming and/or Internet content, transmitted from one or more content providers (or sources) that are external to, and/or remote from, the vehicle. As desired, viewing content likewise can be stored within an internal memory system of the portable media devices.

Conventional vehicle information systems, however, suffer from numerous disadvantages. For example, few conventional vehicle information systems provide robust network security. Those vehicle information systems that do provide security distribute security components across multiple system elements, such as line replaceable units (or LRUs). However, these system elements themselves are insecure. For example, hardware and software applications that process and store commercial transaction information, such as credit card payment data, are distributed throughout current vehicle information systems, exposing sensitive data and placing confidential information at risk. Further, conventional vehicle information systems cannot identify security breaches.

In view of the foregoing, a need exists for an improved system and method for providing security for vehicle information systems in an effort to overcome the aforementioned obstacles and deficiencies of conventional vehicle information systems.

BRIEF DESCRIPTION OF THE DRAWINGS

FIG. 3A is an exemplary top-level drawing illustrating the information system of FIG. 1, wherein the information system comprises a vehicle information system installed aboard an automobile.

Figure 1:
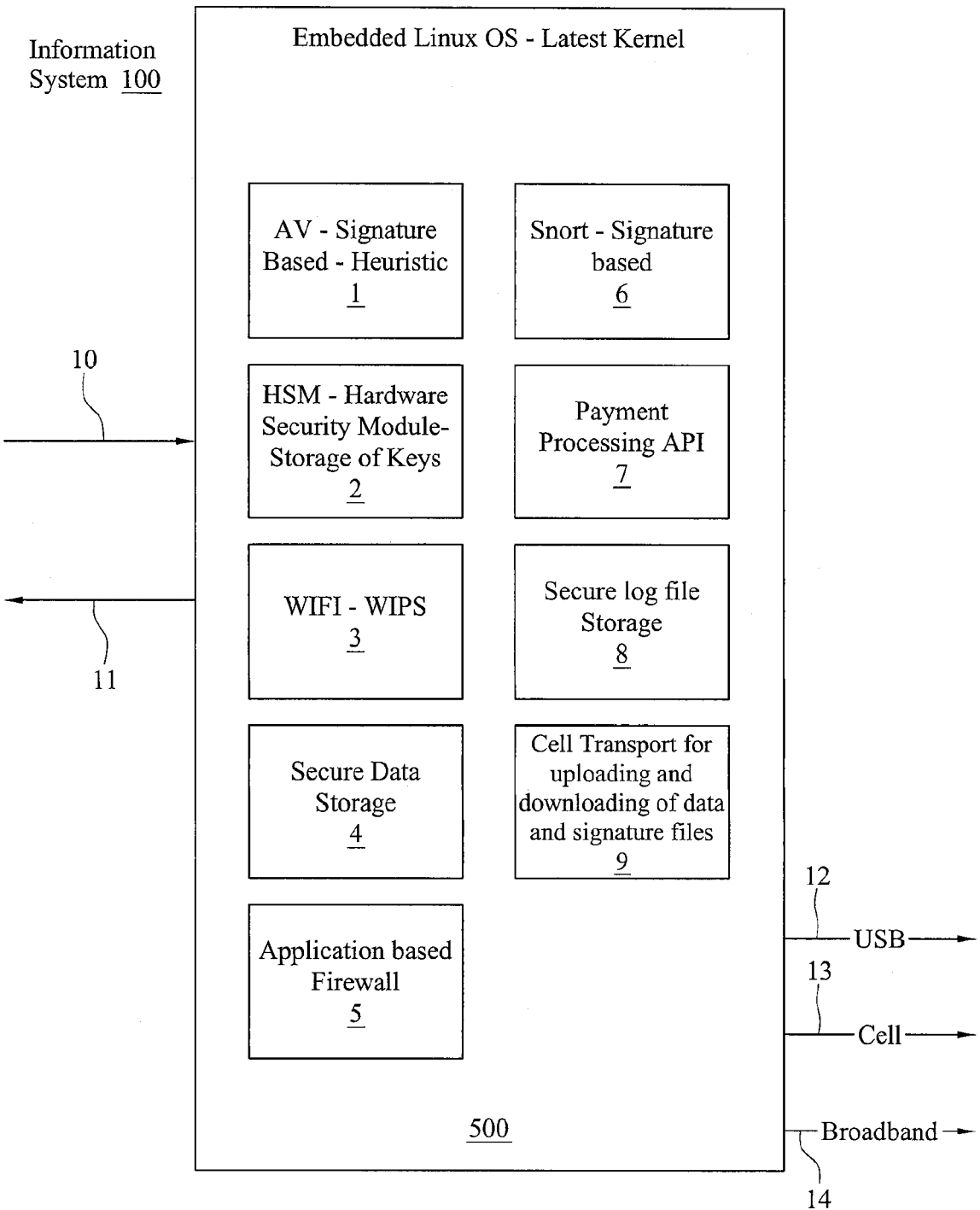
FIG. 1 is an exemplary top-level block diagram illustrating an embodiment of a security system for information systems, wherein the security system is disposed within a single line replaceable unit.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since conventional security systems for vehicle information systems are distributed across multiple, insecure system elements and cannot identify security breaches, a security system that provides network security to a vehicle information system and that is disposed within a single system element can prove desirable and provide a basis for a wide range of system applications, such as vehicle information systems for use aboard automobiles, aircraft, ships, buses, trains and other types of conventional passenger vehicles during travel.

This result can be achieved, according to one embodiment disclosed herein, by the security system 500 as illustrated in FIG. 1.

Turning to FIG. 1, the security system 500 can provide network security for an information system 100. The security system 500 is shown as being provided as an integrated security system. In other words, the security system 500 can be disposed within a single system element of the information system 100. The security system 500 advantageously can comprise an all-in-one security system that facilitates security system functions, in whole and/or in part, for the information system 100. Thereby, the security system 500 can provide a defense in depth approach by adding multiple layers of security to the information system 100.

The security system 500 can provide selected security system functions such as secure storage of keys used to encrypt and/or decrypt system data, storage of security-related application programming interfaces (APIs), storage of a security log file, and/or secure storage for private data, such as user (or passenger) credit card data and/or medical data. The security system 500 likewise can utilize antivirus software, anti-spyware software, an application firewall, and/or a network firewall. As desired, the security system 500 can include an intrusion prevention system (IPS) and/or an intrusion detection system (IDS). If the information system 100 includes a wireless communication (or distribution) system 320 (shown in FIGS. 3A-3B), such as a wireless fidelity (Wi-Fi) network, for example, the security system 500 can include an intrusion prevention system (IPS) and/or an intrusion detection system (IDS) that is suitable for use with wireless network systems. The security system functions described herein are not exhaustive and are provided herein for purposes of illustration only and not for purposes of limitation.

Exemplary security system functions of the security system 500 are discussed in more detail below with reference to FIG. 1. The security system functions of the security system 500 can comprise any conventional type of security system functions and are shown and described with reference to FIG. 1 for purpose of illustration only and not for purposes of limitation. The security system 500, for example, can include antivirus (and/or anti-malware) software 1 for scanning network traffic, files, and/or other conventional types of data being exchanged with the information system 100. Preferably, the antivirus software 1 is signature-based antivirus software. The antivirus software 1 thereby can be periodically (or regularly) updated, such as at least once a month, for the latest virus signatures. As the data is transmitted through the security system 500, the antivirus software 1 can inspect the data against its virus signature files and thereby allow safe data to propagate and/or prevent malicious code from harming either the security system 500, the information system 100, and/or adjacent peripheral systems, e.g., an In-Flight Entertainment system.

Alternatively, and/or additionally, the security system 500 advantageously can utilize hardware based encryption. As illustrated in FIG. 1, Hardware Security Module (HSM) 2 of the security system 500 can be provided as an integrated circuit device that stores sensitive information using hardware encryption. For example, the HSM 2 may manage digital keys, accelerate cryptoprocesses in terms of digital signings and provide strong authentication to access critical keys for various software modules or LRUs. The encryption keys thereby can be stored in a secure place to reduce risk exposure. HSM 2 preferably meets and/or exceeds Federal Information Processing Standard (FIPS) level II certification. As desired, the HSM 2 system may handle asymmetric key pairs (and certificates) used in public key cryptography and symmetric keys. HSM 2 is a more robust security solution than conventional security solutions because software encryption-based designs can be utilized to hide information but can be reverse engineered, risking exposure to sensitive data. Software encryption-based designs likewise may present significant risk. For example, the design may be disclosed (or otherwise discovered), and/or some unforeseen event could happen to the limited number of people who know the design.

Turning If the information system 100 includes a wireless distribution system 320 (FIGS. 3A, 3B), the security system 500 may include a wireless fidelity (Wi-Fi) device 3. The Wi-Fi device 3 preferably has a built-in access point 368 (shown in FIG. 5B), such as a wireless access point (WAP), that supports wireless communications. Communications for the Wi-Fi device 3, in whole and/or in part, can pass through -the wireless access point. Since wireless connectivity typically is deemed insecure, a Denial of Service (DOS) attack could render the information system 100 useless, preventing crew and passengers from communicating. If all wireless communications pass through the access point 368, however, all communication packets can pass through Wireless Intrusion Prevention Software (WIPS) that can block and/or deny all de-auth (DOS) attacks and prevent one or more wireless devices, such as a personal media device 200 (shown in FIG. 5B), from accessing the content distribution system 320.

The security system 500 alternatively, and/or additionally, can provide secure data storage 4. The secure data storage 4 can be provided in any conventional manner and can include sufficient storage resources for securely storing credit card transactions and/or other sensitive data of any kind in an encrypted format. As desired, the data can be securely stored in accordance with a relevant data security standard. Exemplary security standards may include Payment Card Industry Data Security Standard (PCI DSS) for credit card information and/or Health Insurance Portability and Accountability Act (HIPAA) for medical information. As desired, private data likewise can include personal information protected under applicable law. European personal data privacy laws, for example, protect any type of data, such as name, address, and/or frequent flyer number, that can be used to identify a person.

As shown in FIG. 1, the security system 500 can include an Application Based Firewall 5. Applications used by the information system 100 typically communicate with each other and transfer data to (and/or from) various locations on the communication (or distribution) system 320. This data can be malformed and/or cause unexpected results, such as buffer overflows and/or remote code execution. Malformed data and/or unexpected results can compromise the information system 100. The application firewall 5 can inhibit malformed data from passing between applications and/or causing unexpected results. Moreover, an Application Based Firewall 5 (or Web Application Firewall) may provide a defense at the network security level for web application attacks capable of being launched on TCP/UDP port 80—a port that must remain open (and vulnerable) due to normal and legitimate web site traffic transmitted on the port. Similar to the antivirus software 1, the Application Based Firewall 5 may receive periodic updates in order to combat the latest web vulnerabilities.

The intrusion prevention system (IPS) and/or intrusion detection system (IDS) 6 of the security system 500 can identify and/or prevent unauthorized access to the information system 100 by blocking unwanted data types or fragments. As desired, the IPS/IDS 6 can filter traffic based on data signatures or downloadable rules that may be updated on a regular or ad hoc basis. If a breach occurs, the security system 500 can enable the information system 100 to notify authorized personnel, such as ground control, of the breach and can respond accordingly. In an exemplary embodiment, the IDS/IPS 6 may be configured by adopting a third party open source solution, such as SNORT® provided by Sourcefire, Inc., headquartered in Columbia, Md. In a hard wired environment, the IPS/IDS 6 may be most effective in detecting intrusion if it is configured to operate as the initial input 10 to the security system 500—thereby preventing malicious data packets from entering, and possibly disabling, the security system 500. In a wireless input environment, however, a person of ordinary skill could readily determine that the Wireless Intrusion Prevention System 3 may be the initial point of entry to the security system 500. A WIPS 3 may be capable of preventing unauthorized network access to the security system 500 by wireless devices.

As desired, the security system 500 can include a payment processing system 7. The payment processing system 7 can be provided as a software (or API) application and/or can process credit card transactions and other types of secure transactions. Preferably, the payment processing system 7 resides within the security system 500, yet remains segmented from the rest of the information system 100 due the sensitivity of the data housed in the payment processing system 7 and the anticipated audits over the handling of the data. The APIs provided by the payment processing system 7 may be capable of being called by other applications and LRUs but the PCI-DSS compliant system preferably is entirely self contained, thereby minimizing the scope of PCI-DSS compliance.

FIG. 1 shows that the security system 500 has a Secure Log File 8. The Secure Log File 8 can be provided in any conventional manner. All security related events from each line replaceable unit (LRU) 326 (shown in FIG. 4) preferably are stored within the Secure Log File Storage System 8. The Secure Log File Storage System 8 essentially can serve as a central log aggregate for the information system 100.

Figure 2A:
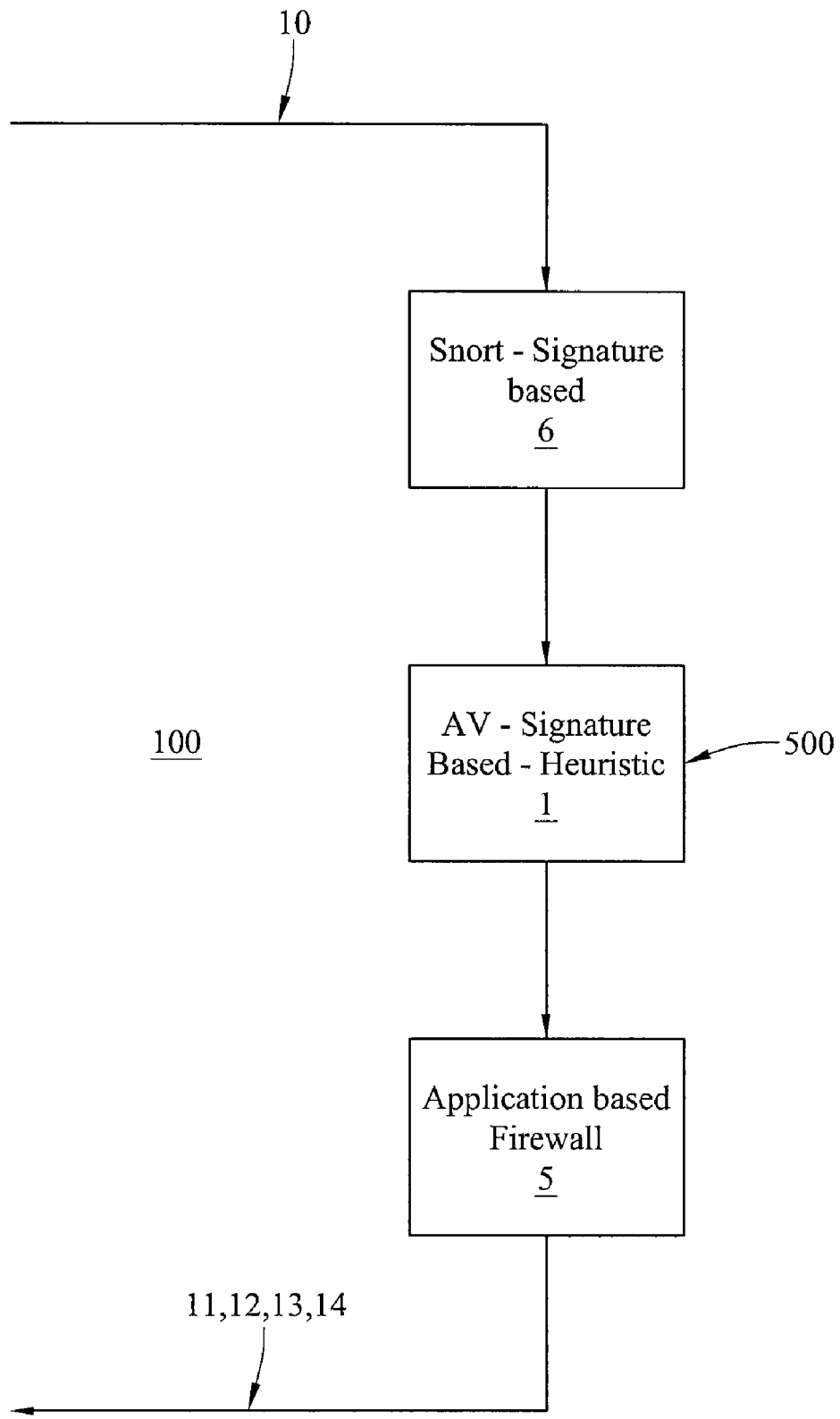
FIG. 2A is an exemplary block diagram illustrating a selected method by which data can propagate through the security system of FIG. 1.
Figure 2B:
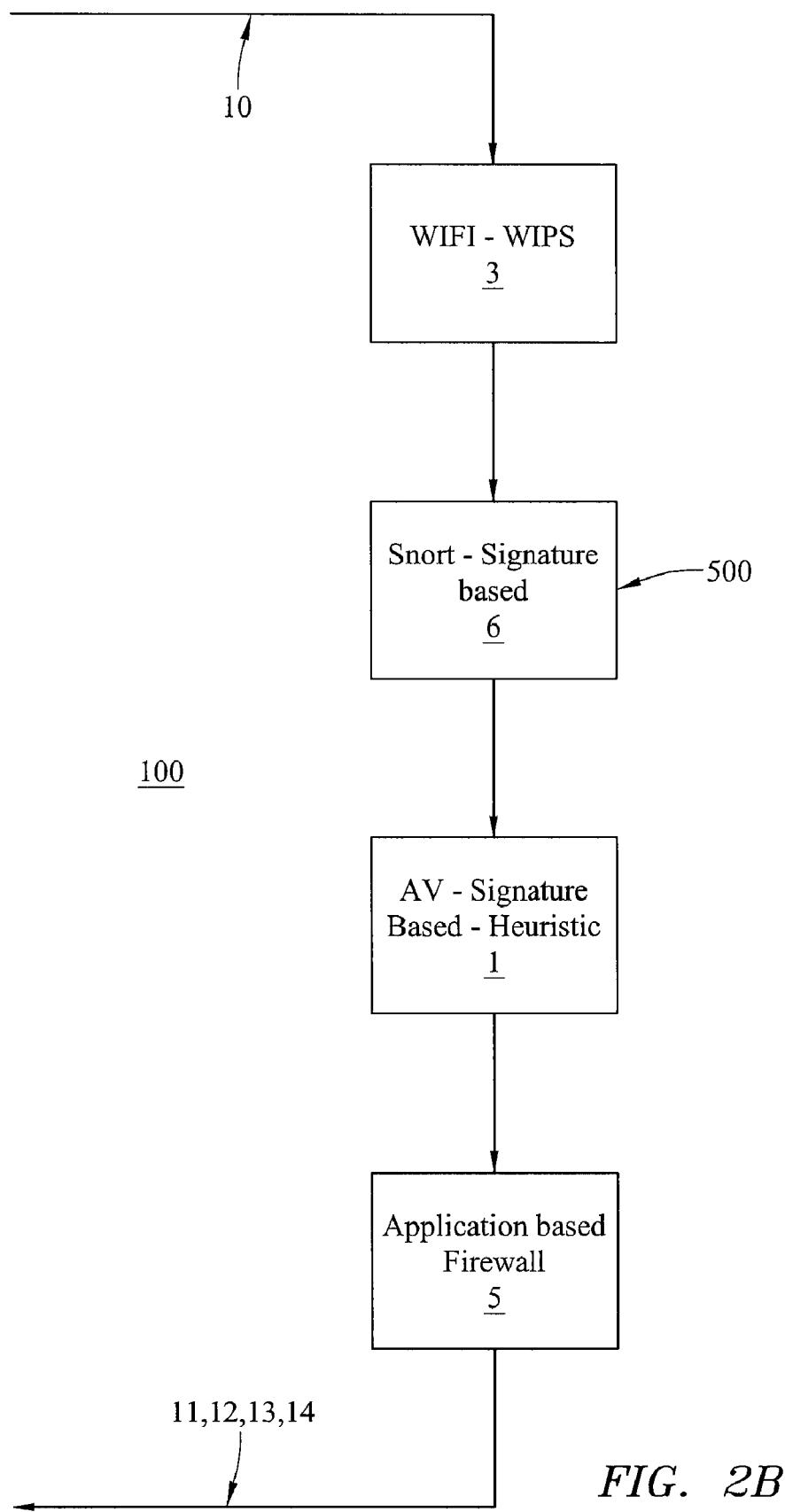
FIG. 2B is an exemplary block diagram illustrating an alternative method by which the data can propagate through the security system of FIG. 1, wherein the data is provided to the security system in a wireless manner.
Figure 2C:
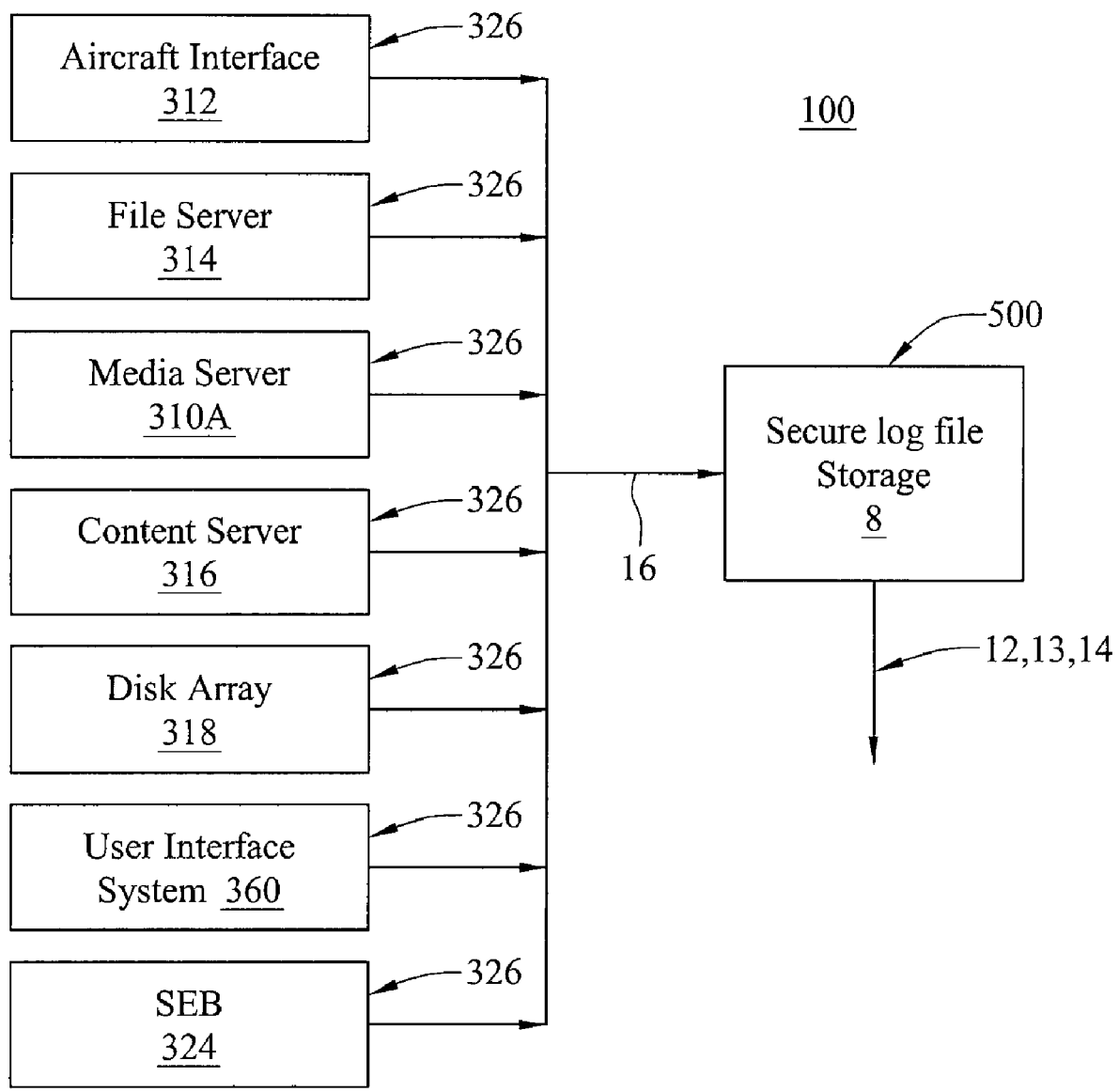
FIG. 2C is an exemplary block diagram illustrating another alternative method by which the data can propagate through the security system of FIG. 1, wherein the data comprises a security log file for storage in a secure log file storage system.

Turning briefly to FIG. 2C, for example, a plurality of local LRUs 326 are illustrated as communicating with the security log file 8 over a direct and secure connection 16. Exemplary LRUs 326 can include an Aircraft Interface 312, File Server 314, Media Server 310A, Content Server 316, Disk Array 318, a user interface system 360, and/or a seat electronics box (SEB) (and/or video seat electronics box (VSEB) and/or premium seat electronics box (PSEB)) 324 without limitation. Exemplary LRUs 326 are shown and described in U.S. Pat. No. 7,675,849, entitled "SYSTEM AND METHOD FOR ROUTING COMMUNICATION SIGNALS VIA A DATA DISTRIBUTION NETWORK," and in co-pending United States patent application, entitled "SYSTEM AND METHOD FOR RECEIVING BROADCAST CONTENT ON A MOBILE PLATFORM DURING TRAVEL," application Ser. No. 12/237,253, filed on Sep. 24, 2008, which are assigned to the assignee of the present application and the respective disclosures of which are hereby incorporated herein by reference in their entireties and for all purposes. These LRUs 326 may have a need to generate security log files; however, it may not be feasible to store the log files on the respective local LRUs 326 due to their unsecured nature and/or lack of adequate storage.

In an effort to secure transmission between LRUs 326 and the secure log file storage 8, each LRU 326 configured to interface with the secure log file 8 may be configured to broadcast a unique identifier to the secure log file 8 receiver system. This interaction may adopt certificate-based authentication that is keyed to either or both of each LRUs IP or MAC address. As security log files are generated over Syslog UDP port 514, the security log files may be written to the secure log file storage 8, which may comprise one or more hard drive, compact flash device, solid state device, and/or any other adequate storage mechanism. As desired, the log files may also be encrypted by using Advanced Encryption Standard (AES) 256 or other adequate encryption means. The security system 500 preferably is configured to provide the security log files stored within the secure log file storage 8 to the remote processing system 15 (shown in FIG. 2F) via a secure Universal Serial Bus (USB) connection 12, a secure cellular communication connection 13, and/or a secure broadband communication connection 14 of the security system 500. Thereby, the processing system 15 can receive information related to any denial of service (DoS) attack, data snooping, and other types of data security incidents detected by the security system 500 and can trace the security risk to its origin and/or identify the attack methodology used for preparing a response to the security incidents.

Returning to FIG. 1, the security system 500 can receive data and other information 10 from the information system 100 and can provide data and other information 11 to the information system 100. The security system 500 can communicate with the information system 100 in any conventional wired and/or wireless manner, including in the manner set forth below with reference to the communication (or distribution) system 320 (shown in FIGS. 3A-B and 4). Preferably, the security system 500 and the information system 100 communicate via a wired communication connect, such as a fiber-optic communication connection, to help ensure secure communications between the security system 500 and the information system 100.

The security system 500 likewise can provide secure information to a processing system 15 (shown in FIG. 2F) that is remote from the information system 100. For example, the security system 500 can provide sensitive commercial transaction information, such as credit card payment data, to the remote processing system 15 for subsequent processing and completion of the commercial transaction. The security system 500 can provide the commercial transaction information to the remote processing system 15 in any conventional manner. An exemplary wireless manner of transmitting the commercial transaction information to the remote processing system 15 can include secure cellular communication connection 13 and/or secure broadband communication connection 14; whereas, a secure Universal Serial Bus (USB) connection is an illustrative manner for transmitting the commercial transaction information to the remote processing system 15 in a wired manner. If installed on an aircraft 390B (shown in FIG. 3B), for example, the information system 100 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif., and can include Panasonic Avionics' eXconnect system that supports broadband communications with a terrestrial Earth station.

The remote processing system 15 can be provided in any suitable manner based, for example, upon the type of data being transmitted. Exemplary remote processing systems 15 are shown and described in co-pending United States patent applications, entitled "SYSTEM AND METHOD FOR MANAGING CONTENT ON MOBILE PLATFORMS," application Ser. No. 11/123,327, filed on May 6, 2005; entitled "SYSTEM AND METHOD FOR RECEIVING BROADCAST CONTENT ON A MOBILE PLATFORM DURING TRAVEL," application Ser. No. 12/237,253, filed on Sep. 24, 2008, and entitled "SYSTEM AND METHOD FOR PERFORMING REAL TIME DATA ANALYSIS," application Ser. No. 12/638,655, filed on Dec. 15, 2009, which are assigned to the assignee of the present application and the respective disclosures of which are hereby incorporated herein by reference in their entireties and for all purposes.

FIG. 1 shows that the security system 500 can include a cell transport system 9 for supporting the cellular communication connection 13. Data and signature files thereby can be uploaded to (and/or downloaded from) the security system 500 via the cellular communication connection 13. Although illustrated in FIG. 1 as including the antivirus software 1, the Hardware Security Module (HSM) 2, the wireless fidelity (Wi-Fi) device 3, the secure data storage 4, the Application Based Firewall 5, the intrusion prevention system (IPS) and/or intrusion detection system (IDS) 6, the payment processing system 7, the Secure Log File 8, and the cell transport system 9, the security system 500 can include any combination of one or more of the above system components without limitation.

One manner by which data can propagate through the security system 500 is illustrated in FIG. 2A. Turning to FIG. 2A, the security system 500 is shown as including at least the intrusion prevention system (IPS) and/or intrusion detection system (IDS) 6, the antivirus software 1, and the Application Based Firewall 5. The intrusion prevention system (IPS) and/or intrusion detection system (IDS) 6 can receive inbound data traffic in any conventional wired and/or wireless manner via the initial input 10 to the security system 500. Receiving the inbound data traffic, the intrusion prevention system (IPS) and/or intrusion detection system (IDS) 6 can filter the inbound data traffic based upon data signature information. Thereby, the security system 500 can block any unwanted data types and/or data fragments from being transmitted to the information system 100.

The intrusion prevention system (IPS) and/or intrusion detection system (IDS) 6 is shown as providing the filtered inbound data traffic to the antivirus software 1. The antivirus software 1 can inspect the filtered inbound data traffic against one or more virus signature (and/or malware) files. As desired, the antivirus software 1 likewise can determine a data type for the filtered inbound data traffic. If the filtered inbound data traffic is determined to include a virus (and/or malware) and/or a prohibited data type, the antivirus software 1 blocks the filtered inbound data traffic; otherwise, the antivirus software 1 permits the filtered inbound data traffic to be transmitted to the Application Based Firewall 5. Receiving the filtered inbound data traffic from the antivirus software 1, the Application Based Firewall 5 inspects the filtered inbound data traffic for web applications. In other words, the Application Based Firewall 5 validates the filtered inbound data traffic for web applications, such as Structured Query Language (SQL) injection and/or Cross-site scripting (XSS).

The filtered inbound data traffic that is validated by the Application Based Firewall 5 can be provided to the information system 100 via the output 11 of the security system 500. Alternatively, and/or additionally, the validated inbound data traffic can be provided to the remote processing system 15 (shown in FIG. 2F) via the secure Universal Serial Bus (USB) connection 12, the secure cellular communication connection 13, and/or the secure broadband communication connection 14 of the security system 500 in the manner set forth in more detail above with reference to FIG. 1. Although shown and described as comprising an exemplary arrangement of the intrusion prevention system (IPS) and/or intrusion detection system (IDS) 6, the antivirus software 1, and the Application Based Firewall 5 with reference to FIG. 2A for purposes of illustration only, the intrusion prevention system (IPS) and/or intrusion detection system (IDS) 6, the antivirus software 1, and the Application Based Firewall 5 can be provided in any suitable arrangement. The security system 500 likewise can include a greater and/or lesser number of security component modules.

If the information system 100 includes a wireless distribution system 320 (FIGS. 3A, 3B), for example, the security system 500 shown in FIG. 2A can further include a wireless fidelity (Wi-Fi) device 3 as illustrated in FIG. 2B. The wireless fidelity (Wi-Fi) device 3 can be provided in the manner set forth in more detail above with reference to FIG. 1 and is shown as being disposed between the initial input 10 to the security system 500 and the intrusion prevention system (IPS) and/or intrusion detection system (IDS) 6. The wireless fidelity device 3 thereby can receive and inspect inbound wireless data traffic for denial of service (DoS) attacks, data snooping, and other types of wireless data security risks. Advantageously, the wireless fidelity device 3 can block any unwanted inbound wireless data traffic and can provide the wanted inbound wireless data traffic to the intrusion prevention system (IPS) and/or intrusion detection system (IDS) 6, the antivirus software 1, and the Application Based Firewall 5 for further inspection, such as filtering and/or validation, in the manner discussed in more detail above with reference to FIG. 2A. The processed inbound data traffic thereby can be provided to the information system 100 via the output 11 of the security system 500 and/or to the remote processing system 15 (shown in FIG. 2F) via the secure Universal Serial Bus (USB) connection 12, the secure cellular communication connection 13, and/or the secure broadband communication connection 14 of the security system 500 in the manner described above.

Figure 2D:
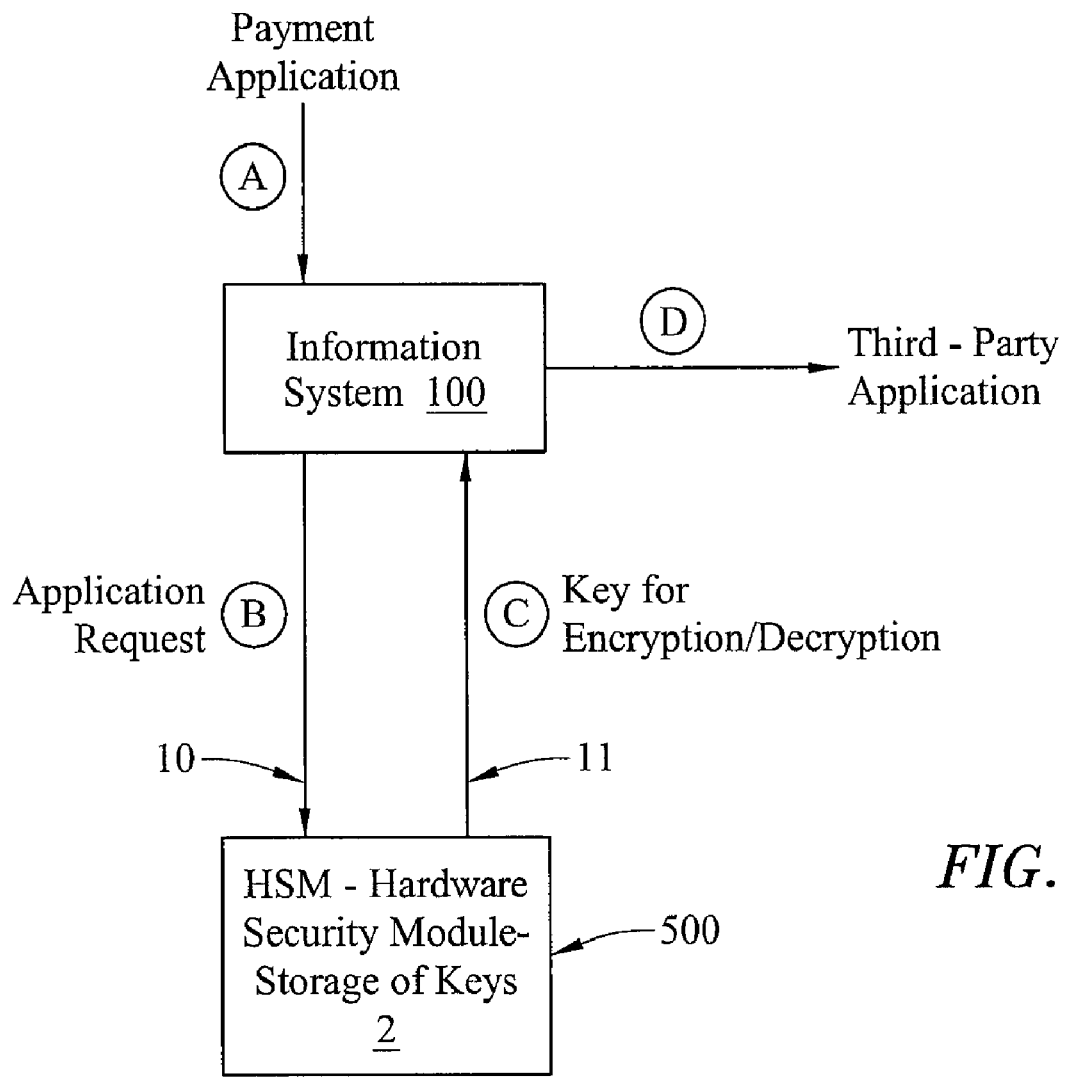
FIG. 2D is an exemplary block diagram illustrating another alternative method by which the data can propagate through the security system of FIG. 1, wherein the data comprises payment application data.

Turning to FIG. 2D, the security system 500 is illustrated as including the Hardware Security Module (HSM) 2. The Hardware Security Module 2 is provided in the manner discussed in more detail above with reference to FIG. 1. The information system 100 is shown, at A, as receiving payment application information, media content, public key infrastructure (PKI) authentication data, and/or any other relevant type of inbound data traffic. If the inbound data traffic includes a request for encryption/decryption key information, the information system 100, at B, can provide the request to the Hardware Security Module 2 via the initial input 10 to the security system 500. At C, the Hardware Security Module 2 can responds to the request by providing the requested encryption/decryption key information to the information system 100 via the output 11 of the security system 500. The information system 100 thereby can provide, at D, the requested encryption/decryption key information to a third-party application that requires the encryption/decryption key information for encrypting and/or decrypting the inbound data traffic.

Figure 2E:
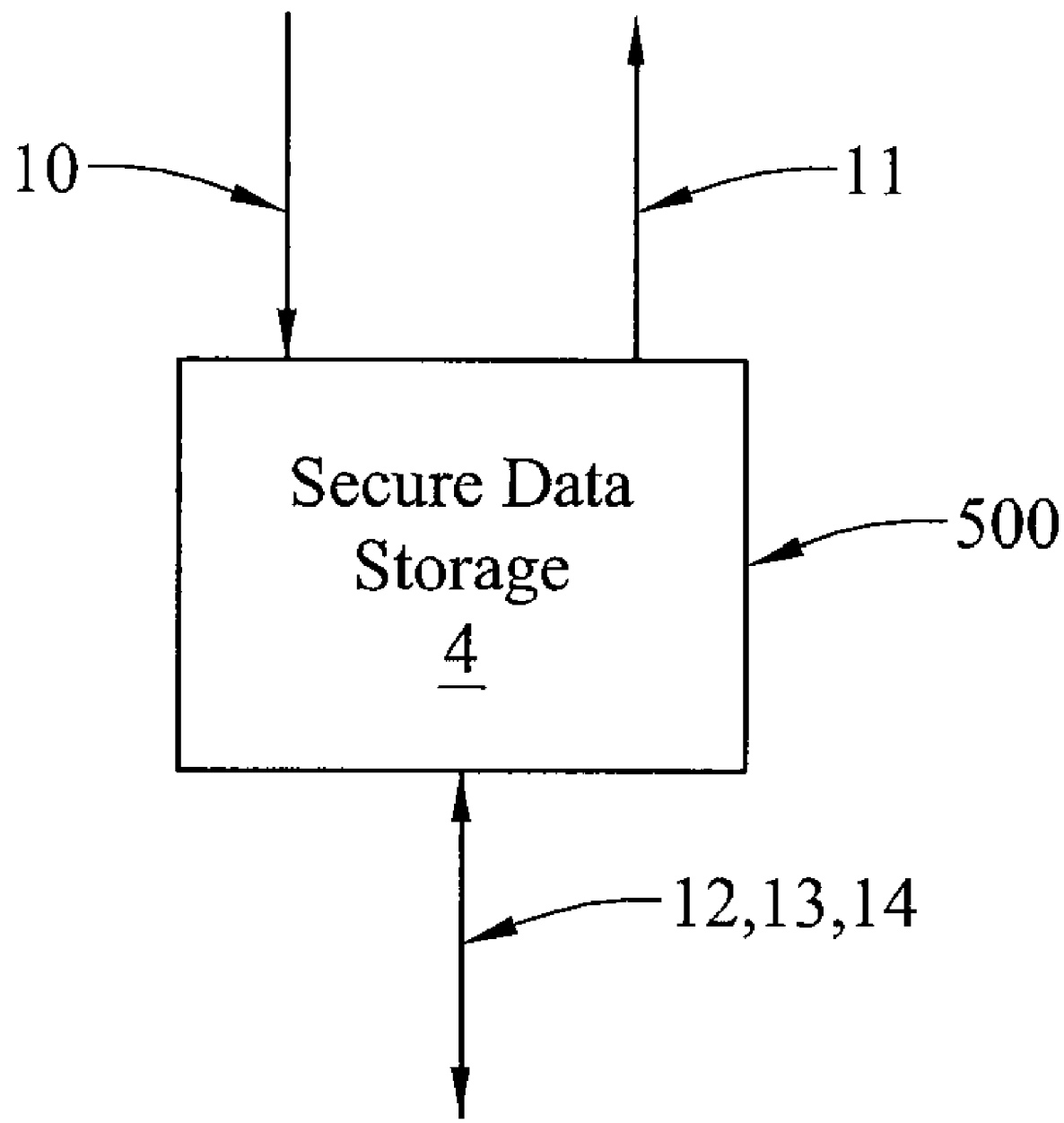
FIG. 2E is an exemplary block diagram illustrating another alternative method by which the data can propagate through the security system of FIG. 1, wherein the data is stored in a secure data storage system.

FIG. 2E illustrates an exemplary embodiment of the secure data storage 4 for securely storing credit card transactions, personal identifiable information (PII), and/or other types of sensitive data in the manner discussed in more detail above with reference to FIG. 1. The secure data storage 4 can receive the sensitive data from the information system 100 via the initial input 10 of the security system 500 and/or from the remote processing system 15 (shown in FIG. 2F) via the secure Universal Serial Bus (USB) connection 12, the secure cellular communication connection 13, and/or the secure broadband communication connection 14 of the security system 500. Upon receiving the sensitive data, the secure data storage 4 can securely store the sensitive data, preferably in an encrypted format, and can provide the stored sensitive data upon receiving proper authorization. The secure data storage 4 thereby can provide the stored sensitive data to the information system 100 via the output 11 of the security system 500 and/or to the remote processing system 15 (shown in FIG. 2F) via the secure Universal Serial Bus (USB) connection 12, the secure cellular communication connection 13, and/or the secure broadband communication connection 14 of the security system 500 in the manner set forth in more detail above.

Figure 2F:
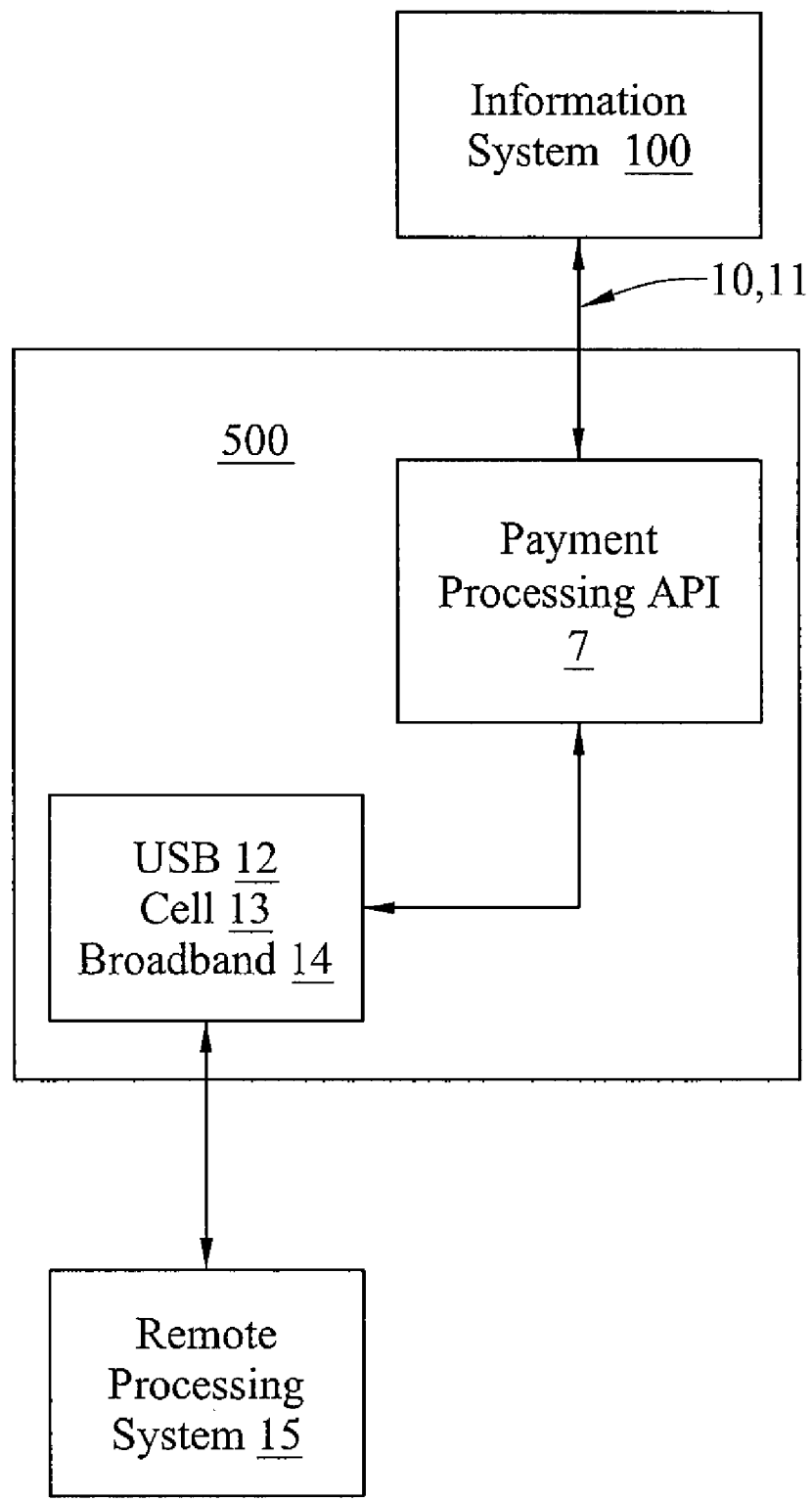
FIG. 2F is an exemplary block diagram illustrating another alternative method by which the data can propagate through the security system of FIG. 1, wherein the data comprises secure payment application code.

Turning to FIG. 2F, the security system 500 is illustrated as including the payment processing system 7. The payment processing system 7 preferably is provided in the manner discussed in more detail above with reference to FIG. 1 and provides secure payment application code storage. As illustrated in FIG. 2F, the payment processing system 7 exchange payment application data with the information system 100 via the initial input 10 and the output 11 of the security system 500. The payment processing system 7 likewise can exchange payment application data with the remote processing system 15 via the secure Universal Serial Bus (USB) connection 12, the secure cellular communication connection 13, and/or the secure broadband communication connection 14 of the security system 500 in the manner set forth in more detail above. Thereby, payment software applications, such as application programming interfaces (APIs) and other payment application code, used in the payment application process can be securely stored within the security system 500, wherein other applications and/or LRUs 326 can access the software applications stored within the payment processing system 7.

Storage of the software applications within the payment processing system 7 advantageously segments the payment software applications and/or the payment application data from the remainder of the information system 100. With reference to the Payment Card Industry (PCI) standard, for example, processing of payment application data can be subject to audit. By maintaining the payment software applications and/or the payment application data within the payment processing system 7, performance of audits can be facilitated because the payment information is segmented. Thereby, only the security system 500, rather than the entire information system 100, requires examination during an audit, minimizing the scope of the information system 100 that is subject to compliance under the PCI standard.

Figure 3B:
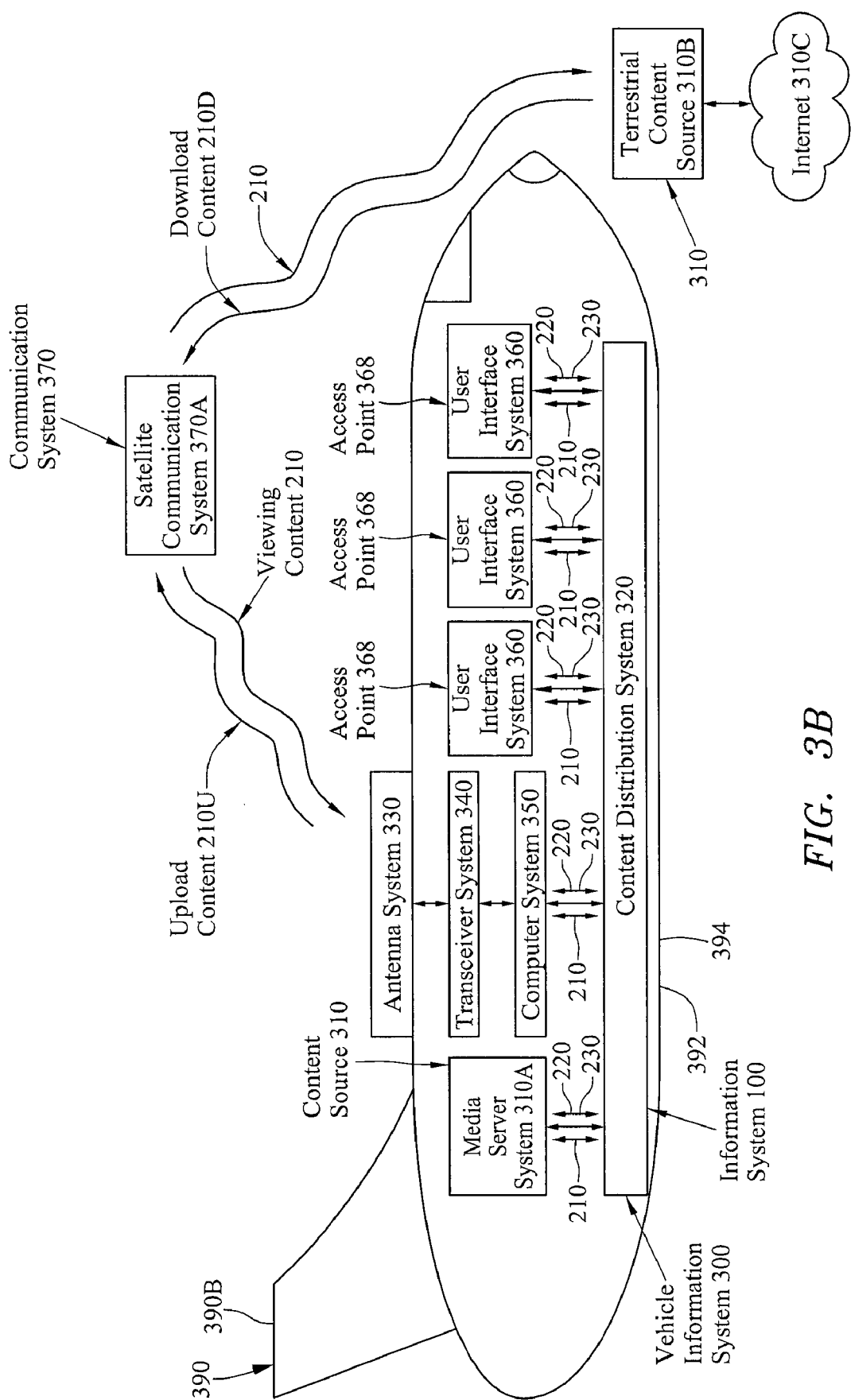
FIG. 3B is an exemplary top-level drawing illustrating the vehicle information system of FIG. 3A, wherein the vehicle information system is installed aboard an aircraft.

Although the information system 100 can be disposed in a fixed location, such as a building, the information system 100 likewise can advantageously be applied in mobile system applications. Turning to FIGS. 3A-B, the information system 100 is shown as comprising a vehicle information system 300 that can be configured for installation aboard a wide variety of vehicles 390. Exemplary types of vehicles can include an automobile 390A (shown in FIG. 3A), an aircraft 390B (shown in FIG. 3B), a bus, a recreational vehicle, a boat, and/or a locomotive, or any other type of passenger vehicle without limitation. If installed on an aircraft 390B as illustrated in FIG. 3B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 3A-B, the vehicle information system 300 comprises at least one conventional content source 310 and one or more user (or passenger) interface systems 360 that communicate via a real-time content distribution system 320. Each content source 310 can be provided in the manner set forth in U.S. Pat. No. 7,715,783, entitled "SYSTEM AND METHOD FOR RECEIVING BROADCAST CONTENT ON A MOBILE PLATFORM DURING INTERNATIONAL TRAVEL," and in the co-pending United States patent applications, entitled "SYSTEM AND METHOD FOR DOWNLOADING FILES," application Ser. No. 10/772,565, filed on Feb. 4, 2004; entitled "SYSTEM AND METHOD FOR MANAGING CONTENT ON MOBILE PLATFORMS," application Ser. No. 11/123,327, filed on May 6, 2005; entitled "PORTABLE MEDIA DEVICE AND METHOD FOR PRESENTING VIEWING CONTENT DURING TRAVEL," application Ser. No. 11/154,749, filed on Jun. 15, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "PORTABLE USER CONTROL DEVICE AND METHOD FOR VEHICLE INFORMATION SYSTEMS," application Ser. No. 12/210,689, filed on Sep. 15, 2008; entitled "SYSTEM AND METHOD FOR RECEIVING BROADCAST CONTENT ON A MOBILE PLATFORM DURING TRAVEL," application Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," application Ser. No. 12/245,521, filed on Oct. 3, 2008, which are assigned to the assignee of the present application and the respective disclosures of which are hereby incorporated herein by reference in their entireties and for all purposes.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system 310A, for storing viewing content 210, such as preprogrammed viewing content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D.

The viewing content 210 can comprise any conventional type of audio and/or video viewing content, such as stored (or time-delayed) viewing content and/or live (or real-time) viewing content, in the manner set forth in the above-referenced U.S. Pat. No. 7,715,783, entitled "SYSTEM AND METHOD FOR RECEIVING BROADCAST CONTENT ON A MOBILE PLATFORM DURING INTERNATIONAL TRAVEL," and in the above-referenced co-pending United States patent applications, entitled "SYSTEM AND METHOD FOR DOWNLOADING FILES," application Ser. No. 10/772,565, filed on Feb. 4, 2004; and entitled "PORTABLE MEDIA DEVICE AND METHOD FOR PRESENTING VIEWING CONTENT DURING TRAVEL," application Ser. No. 11/154,749, filed on Jun. 15, 2005. Exemplary viewing content 210 can include television programming content, music content, podcast content, photograph album content, audiobook content, and/or movie content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety and for all purposes. Alternatively, and/or additionally, to entertainment content, such as live satellite television programming and/or live satellite radio programming, the viewing content likewise can include two-way communications, such as real-time access to the Internet 310C (shown in FIG. 3B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety and for all purposes. The exemplary viewing content as shown and described herein are not exhaustive and are provided herein for purposes of illustration only and not for purposes of limitation.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 3B as providing access to the Internet 310C. Although shown and described as comprising the satellite communication system 370A for purposes of illustration, the communication system 370 can comprise any conventional type of wireless communication system, such as a cellular communication system (not shown) and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 3A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media (or content) server system 310A and/or to one or more of the user interfaces 360, as desired. Although shown and described as being separate systems for purposes of illustration, the computer system 350 and the media server system 310A can be at least partially integrated.

Figure 4:
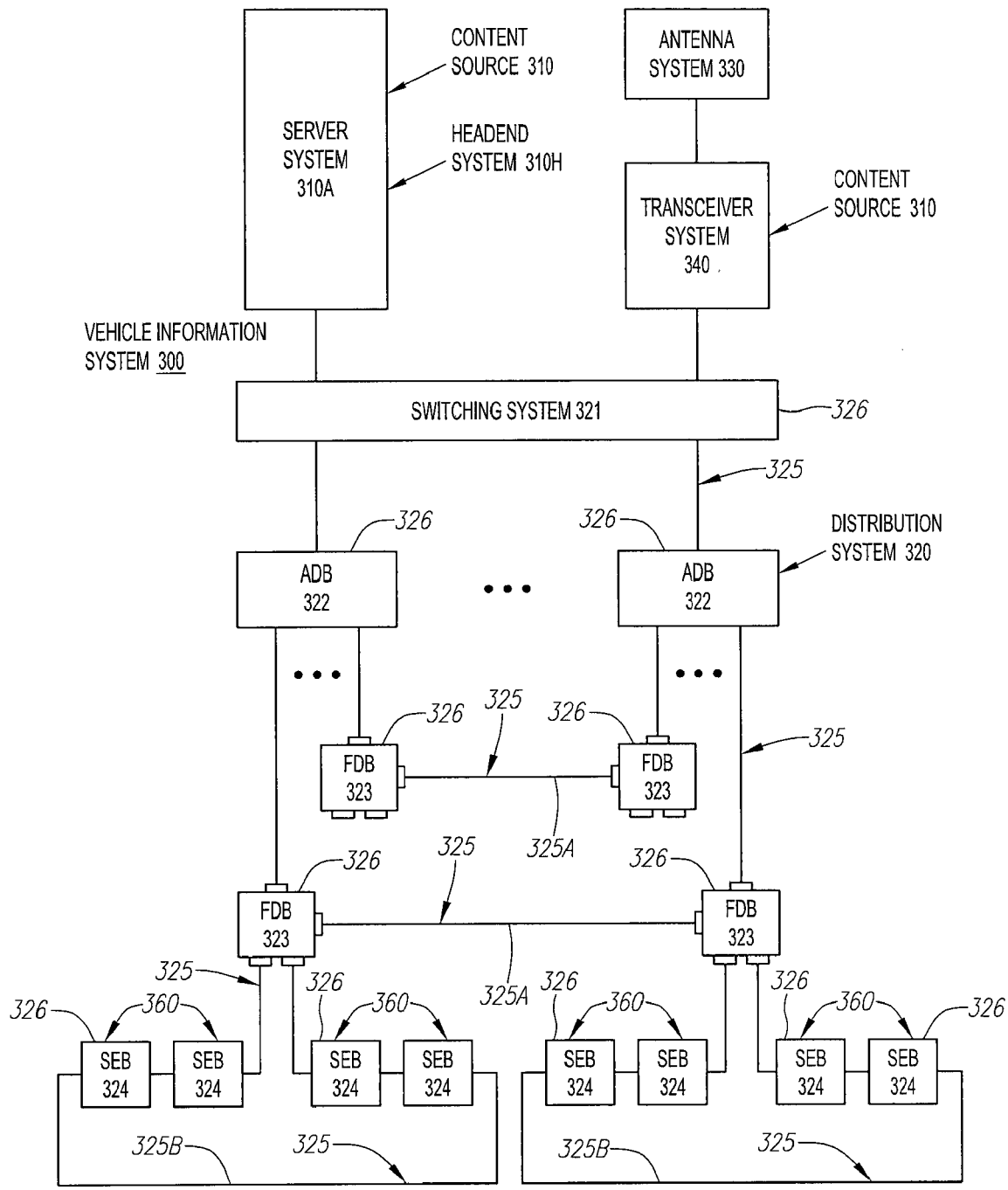
FIG. 4 is an exemplary detail drawing illustrating one preferred embodiment of a distribution system for the vehicle information systems of FIGS. 3A-B.

The vehicle information system elements, including the content sources 310 and the user interface systems 360, are shown in FIGS. 3A-B as communicating via the content distribution system 320. FIG. 4 illustrates an exemplary content distribution system 320 for the vehicle information system 300. The content distribution system 320 of FIG. 4 couples, and supports communication between a headend system 310H, which includes the content sources 310, and the plurality of user interface systems 360. The distribution system 320 as shown in FIG. 4 is provided in the manner set forth in U.S. Pat. No. 7,675,849, entitled "SYSTEM AND METHOD FOR ROUTING COMMUNICATION SIGNALS VIA A DATA DISTRIBUTION NETWORK," and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties and for all purposes. Alternatively, and/or additionally, the distribution system 320 can be provided in the manner set forth in the co-pending United States patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety and for all purposes.

The content distribution system 320, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 320 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps). To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As desired, the distribution system 320 likewise can include a network management system (not shown) provided in the manner set forth in co-pending United States patent applications, entitled "SYSTEM AND METHOD FOR IMPROVING NETWORK RELIABILITY," application Ser. No. 10/773,523, filed on Feb. 6, 2004, and entitled "SYSTEM AND METHOD FOR IMPROVING NETWORK RELIABILITY," application Ser. No. 11/086,510, filed on Mar. 21, 2005, which are assigned to the assignee of the present application and the respective disclosures of which are hereby incorporated herein by reference in their entireties and for all purposes.

As illustrated in FIG. 4, the distribution system 320 can be provided as a plurality of area distribution boxes (ADBs) 322, a plurality of floor disconnect boxes (FDBs) 323, and a plurality of seat electronics boxes (SEBs) (and/or video seat electronics boxes (VSEBs) and/or premium seat electronics boxes (PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 4. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

The switching systems 321, the area distribution boxes (ADBs) 322, the floor disconnect boxes (FDBs) 323, the seat electronics boxes (SEBs) (and/or video seat electronics boxes (VSEBs) and/or premium seat electronics boxes (PSEBs)) 324, the antenna system 330, the transceiver system 340, the content source 310, the server system 310A, the headend system 310H, video interface systems 362 (shown in FIGS. 5A-B), audio interface systems 364 (shown in FIGS. 5A-B), user input systems 366 (shown in FIGS. 5A-B), and other system resources of the vehicle information system 300 preferably are provided as line replaceable units (LRUs) 326. The use of LRUs 326 facilitate maintenance of the vehicle information system 300 because a defective LRU 326 can simply be removed from the vehicle information system 300 and replaced with a new (or different) LRU 326. The defective LRU 326 thereafter can be repaired for subsequent installation. Advantageously, the use of LRUs 326 can promote flexibility in configuring the content distribution system 320 by permitting ready modification of the number, arrangement, and/or configuration of the system resources of the content distribution system 320. The content distribution system 320 likewise can be readily upgraded by replacing any obsolete LRUs 326 with new LRUs 326.

As desired, the floor disconnect boxes 323 advantageously can be provided as routing systems and/or interconnected in the manner set forth in the above-referenced U.S. Pat. No. 7,675,849, entitled "SYSTEM AND METHOD FOR ROUTING COMMUNICATION SIGNALS VIA A DATA DISTRIBUTION NETWORK." The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 4. Each SEB loopback connection 325B therefore forms a loopback path among the daisy-chained seat electronics boxes 324 coupled with the relevant floor disconnect box 323.

Returning to FIGS. 3A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending United States patent application, entitled "PORTABLE MEDIA DEVICE AND METHOD FOR PRESENTING VIEWING CONTENT DURING TRAVEL," application Ser. No. 11/154,749, filed on Jun. 15, 2005, as well as in the manner set forth in the co-pending United States patent application, entitled "SYSTEM AND METHOD FOR PRESENTING HIGH-QUALITY VIDEO TO PASSENGERS ON A MOBILE PLATFORM," Application Ser. No. 60/673,171, filed on Apr. 19, 2005, the disclosure of which is hereby incorporated herein by reference in its entirety and for all purposes.

Figure 5A:
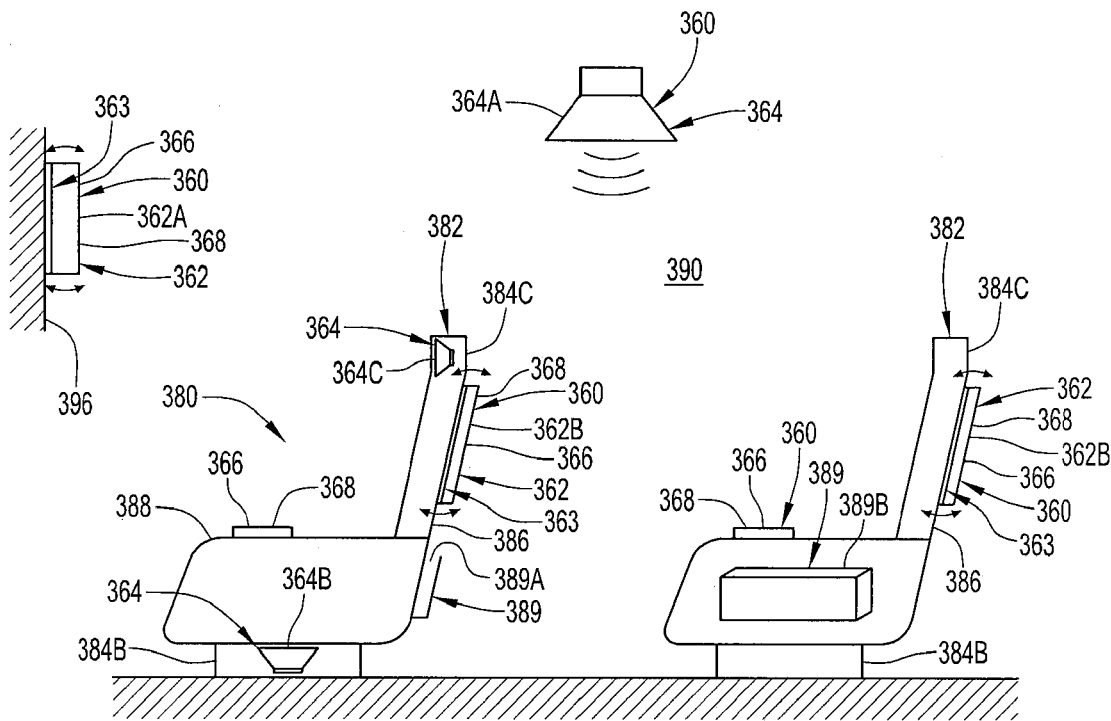
FIG. 5A is an exemplary detail drawing illustrating a passenger cabin of a vehicle, wherein the vehicle information system of FIGS. 3A-B has been installed.

FIG. 5A provides a view of a passenger cabin 380 of a passenger vehicle 390, such as the automobile 390A (shown in FIG. 3A) and/or the aircraft 390B (shown in FIG. 3B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the passenger seat 382. A speaker system likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending United States patent applications, entitled "SYSTEM AND METHOD FOR MOUNTING USER INTERFACE DEVICES," application Ser. No. 11/828,193, filed on Jul. 25, 2007, and entitled "USER INTERFACE DEVICE AND METHOD FOR PRESENTING VIEWING CONTENT," application Ser. No. 11/835,371, filed on Aug. 7, 2007, which are assigned to the assignee of the present application and the respective disclosures of which are hereby incorporated herein by reference in their entireties and for all purposes.

As shown in FIG. 5A, the user interface system 360 likewise can include an input system 366 for permitting the user (or passenger) to communicate with the vehicle information system 300, such as via an exchange of control signals 220. For example, the input system 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 5B) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 5B:
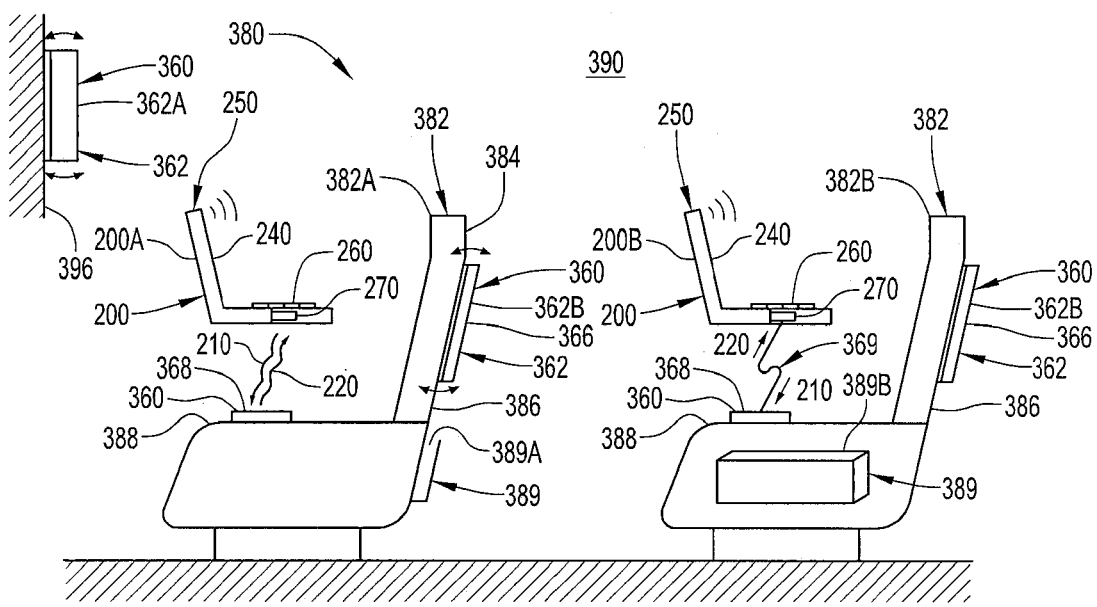
FIG. 5B is an exemplary detail drawing illustrating an embodiment of the vehicle information system of FIG. 5A, wherein the vehicle information system is in communication with a personal media device.

Turning to FIG. 5B, the vehicle information system 300 is shown as communicating with one or more personal media devices 200. Each personal media device 200 can store the audio and/or video viewing content 210 and can be provided as a handheld device, such as a laptop computer, a palmtop computer, a personal digital assistant (PDA), cellular telephone, an iPod® digital electronic media device, an iPhone® digital electronic media device, and/or a MPEG Audio Layer 3 (MP3) device. Illustrative personal media devices 200 are shown and described in the above-referenced U.S. Pat. No. 7,715,783, entitled "SYSTEM AND METHOD FOR RECEIVING BROADCAST CONTENT ON A MOBILE PLATFORM DURING INTERNATIONAL TRAVEL," and in the above-referenced co-pending United States patent applications, entitled "SYSTEM AND METHOD FOR DOWNLOADING FILES," application Ser. No. 10/772,565, filed on Feb. 4, 2004; entitled "PORTABLE MEDIA DEVICE AND METHOD FOR PRESENTING VIEWING CONTENT DURING TRAVEL," application Ser. No. 11/154,749, filed on Jun. 15, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; and entitled "PORTABLE USER CONTROL DEVICE AND METHOD FOR VEHICLE INFORMATION SYSTEMS," application Ser. No. 12/210,689, filed on Sep. 15, 2008, which are assigned to the assignee of the present application and the respective disclosures of which are hereby incorporated herein by reference in their entireties and for all purposes.

The illustrated personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 369 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system elements of the vehicle information system 300 and the personal media device 200 thereby become interchangeable. The personal media device 200 likewise can receive control signals (or commands) 220 and/or operating power from the vehicle information system 300. Thereby, the personal media device 200 advantageously can become a seamless part of the vehicle information system 300.

For example, user instructions 230 (shown in FIGS. 3A-B) for controlling the operation of the vehicle information system 300 can be provided via the input system 366 of the vehicle information system 300 and/or the user control system 260 of the personal media device 200. In other words, the input system 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 3A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the passenger seat 382. For example, the passenger seat 382 can include a storage compartment 389 for providing storage of the personal media device 200. The storage compartment 389 can be provided in any conventional manner and at any suitable portion of the passenger seat 382. As illustrated with passenger seat 382B, the personal media device 200 can be placed in a storage pocket 389B formed in the armrest 388 of the passenger seat 382B. The storage compartment 389 likewise can be provided on the seatback 386 and/or the headrest 384 of the passenger seat 382. Storage compartment 389A of passenger seat 382A, for example, is shown as being formed on the lower seatback 386 of the passenger seat 382A. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

Figure 6:
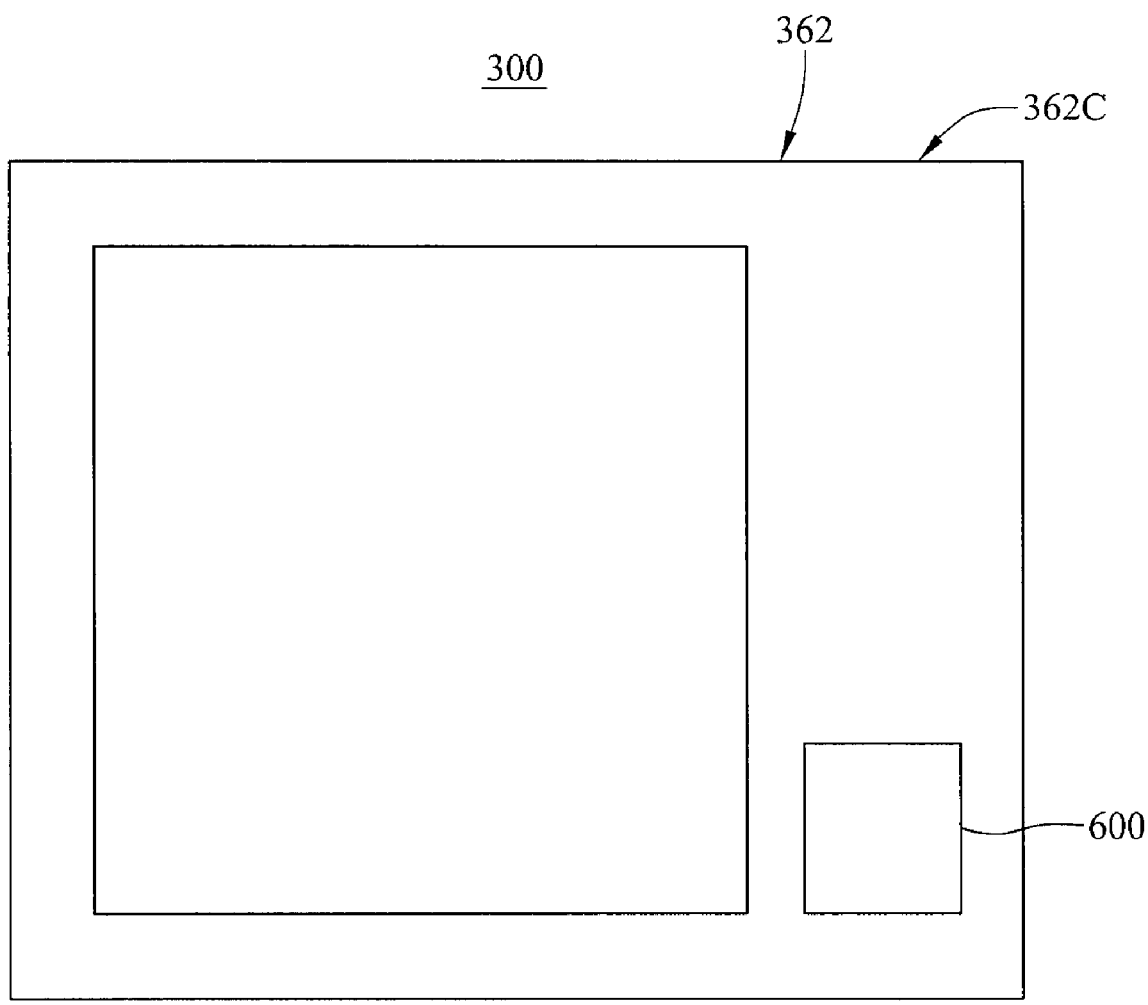
FIG. 6 is an exemplary detail drawing illustrating an alternative embodiment of the security system of FIG. 1, wherein the security system includes a biometric device for preventing unauthorized access to the vehicle information system.

Alternatively, and/or additionally, it may be desired to further enhance the security of the vehicle information system 300 via at least one biometric device 600 as illustrated in FIG. 6. The biometric device 600 can comprise any conventional type of biometric device, such as a face scanner, a hand scanner, a fingerprint scanner, a retina scanner, and/or an iris scanner, can be employed to help prevent unauthorized access to the vehicle information system 300. Advantageously, the biometric device 600 uses human biological characteristics to identify a user rather than relying on username/password-type authentication, which is prone to being forgotten or compromised in any environment. The biometric device 600 can be disposed at any suitable location within a passenger cabin 380 (shown in FIGS. 5A-B) of a passenger vehicle 390 (shown in FIGS. 5A-B) such as a selected video interface system 362 of the vehicle information system 300 as shown in FIG. 6. Preferably, the selected video interface system 362 comprises a crew panel system 362C that is accessible only by authorized personnel, such as crew members and/or maintenance workers. The biometric device 600 thereby can permit the crew members and other authorized personnel a method of authenticating their respective identities with the vehicle information system—minimizing the risk of unauthorized access that has the potential to undermine all other security objectives.

The described embodiments are susceptible to various modifications and alternative forms, and specific examples thereof have been shown by way of example in the drawings and are herein described in detail. The described embodiments, however, are not to be limited to the particular forms or methods disclosed, but to the contrary, the present disclosure is to cover all modifications, equivalents, and alternatives.

What is claimed is:

1. A security appliance, comprising:
   a general purpose computer for running an operating system configured to programmatically execute a plurality of software modules and to interface with a plurality of access points within a distribution system of a selected information system,
   wherein said plurality of software modules provides a plurality of security functions including at least two of an antivirus module, a security log module, a payment processing module, a firewall module, a hardware security module, an intrusion detection/prevention module, and a network interface module, and
   wherein said security appliance is disposed within a single line replaceable unit for installation within the distribution system.

2. The security appliance of claim 1, wherein said network interface facilitates bi-directional communications between the selected information system and an external communication connection.

3. The security appliance of claim 2, wherein said external communication connection includes at least one of a secure wired communication connection, a secure wireless communication connection, a broadband communication connection, a cellular communication connection, and a Universal Serial Bus communication connection.

4. The security appliance of claim 2, wherein said external communication connection is configured to transmit secure data to a processing system that is remote from the selected information system.

5. The security appliance of claim 4, wherein said secure data is selected from a group consisting of credit card data, medical data, and data that is protected under applicable law.

6. The security appliance of claim 1, wherein said intrusion detection/prevention module is configured to identify unauthorized access to a wireless distribution system of the selected information system.

7. The security appliance of claim 1, wherein said hardware security module is accredited to at a security level of at least Federal Information Processing Standard (FIPS) Level 2.

8. The security appliance of claim 1, wherein the distribution system interfaces with said security appliance via a fiber communications medium.

9. The security appliance of claim 1, wherein the operating system comprises a Linux-based operating system.

10. The security appliance of claim 1, wherein the selected information system is installed aboard a passenger vehicle.

11. The security appliance of claim 1, further comprising a biometric authentication device for preventing unauthorized access to the selected information system, said biometric authentication device communicating with the distribution system of the selected information system.

12. The security appliance of claim 11, wherein said biometric authentication device is selected from a group consisting of a face scanner, a hand scanner, a fingerprint scanner, a retina scanner, and an iris scanner.

13. The security appliance of claim 11, wherein said biometric authentication device is associated with a crew panel system of the selected information system.

14. A vehicle information system suitable for installation aboard a passenger vehicle, comprising:
   a content source; and
   a distribution system for communicating with said content source and including the security appliance of claim 1.

15. An aircraft, comprising:
   a fuselage and a plurality of passenger seats arranged within the fuselage; and
   a vehicle information system, said vehicle information system coupled with said fuselage and comprising:
      a headend system that provides overall system control functions for said vehicle information system and that includes a content source;
      a user interface system that includes a user input system for selecting viewing content available from said content source and a content presentation system for presenting the selected viewing content; and
      a distribution system that distributes the selected viewing content throughout said vehicle information system and that includes the security appliance characterized by claim 1.

16. A method for providing network security for an information system, comprising:
   disposing a general purpose computer within a single line replaceable unit;
   installing the line replaceable unit within a distribution system of the information system; and
   enabling the general purpose computer to execute a plurality of software modules that are configured to interface with a plurality of access points within a distribution system of the information system, wherein the plurality of software modules provide a plurality of security functions including at least two of an antivirus module, a security log module, a payment processing module, a firewall module, a hardware security module, an intrusion detection/prevention module, and a network interface module.

17. The method of claim 16, wherein said enabling the general purpose computer includes enabling the network interface module to facilitate bi-directional communications between the information system and an external communication connection for transmitting secure data to a processing system that is remote from the information system.

18. The method of claim 16, wherein said enabling the general purpose computer includes enabling the intrusion detection/prevention module to configure a wireless distribution system of the information system to identify unauthorized access to the information system.

19. The method of claim 16, further comprising installing the information aboard a passenger vehicle.

20. The method of claim 16, further comprising installing a biometric authentication device for preventing unauthorized access to the information system, wherein said biometric authentication device communicates with the distribution system of the information system.

21. The security appliance of claim 20, wherein said installing a biometric authentication device comprises installing said biometric authentication device at a crew panel system of the information system.

22. A computer program product for providing network security for a selected information system, the computer program product being encoded on one or more non-transitory machine-readable storage media and being suitable for execution on a general purpose computer disposed within a single line replaceable unit for installation within a distribution system of the selected information system, comprising:
   instruction for activating at least one access point within the distribution system; and
   instruction for executing a plurality of software modules that provides a plurality of security functions including at least two of an antivirus module, a security log module, a payment processing module, a firewall module, a hardware security module, an intrusion detection/prevention module, and a network interface module; and
   instruction for monitoring signal activity between the selected information system and at least one portable media device via the at least one access point.

23. The computer program product of claim 22, wherein said instruction for executing includes instruction for enabling the network interface module to facilitate bi-directional communications between the selected information system and an external communication connection for transmitting secure data to a processing system that is remote from the selected information system.

24. The computer program product of claim 22, wherein said instruction for executing includes instruction for enabling the intrusion detection/prevention module to configure a wireless distribution system of the selected information system to identify unauthorized access to the selected information system.

25. The computer program product of claim 22, further comprising instruction for preventing unauthorized access to the selected information system via a biometric authentication device, wherein said biometric authentication device communicates with the distribution system of the selected information system.

\* \* \* \* \*